(12) United States Patent
Matsuno

(10) Patent No.: US 12,515,723 B2
(45) Date of Patent: Jan. 6, 2026

(54) CART

(71) Applicant: MAKITA CORPORATION, Anjo (JP)

(72) Inventor: Tadasuke Matsuno, Anjo (JP)

(73) Assignee: MAKITA CORPORATION, Anjo (JP)

( * ) Notice: Subject to any disclaimer, the term of this patent is extended or adjusted under 35 U.S.C. 154(b) by 771 days.

(21) Appl. No.: 17/863,579

(22) Filed: Jul. 13, 2022

(65) Prior Publication Data

US 2023/0015530 A1    Jan. 19, 2023

(30) Foreign Application Priority Data

Jul. 15, 2021    (JP) .................................. 2021-117159

(51) Int. Cl.
*B62B 3/00*    (2006.01)
*B62B 5/00*    (2006.01)

(52) U.S. Cl.
CPC .............. *B62B 3/001* (2013.01); *B62B 5/004* (2013.01)

(58) Field of Classification Search
CPC .... B62B 3/001; B62D 5/0409; B62D 5/0421; B62D 5/0454; B62D 5/0469; B62K 7/0007

See application file for complete search history.

(56) References Cited

U.S. PATENT DOCUMENTS

| | | | | |
|---|---|---|---|---|
| 2,457,397 A | * | 12/1948 | Richards | B62D 63/061 280/80.1 |
| 3,608,659 A | * | 9/1971 | Gardner | E02F 9/2004 280/DIG. 5 |
| 5,127,485 A | * | 7/1992 | Wakuta | B60K 7/0007 310/67 R |
| 5,961,135 A | * | 10/1999 | Smock | B62D 21/183 180/227 |
| 7,114,732 B1 | * | 10/2006 | Ismail | B60D 1/00 280/47.35 |
| 7,210,545 B1 | * | 5/2007 | Waid | B62B 3/12 180/19.1 |
| 8,365,850 B2 | * | 2/2013 | Gal | B62K 3/002 180/209 |

(Continued)

FOREIGN PATENT DOCUMENTS

| | | | |
|---|---|---|---|
| CN | 203157643 U | * | 8/2013 |
| CN | 110001802 A | * | 7/2019 |

(Continued)

*Primary Examiner* — Steve Clemmons
(74) *Attorney, Agent, or Firm* — Sughrue Mion, PLLC

(57) ABSTRACT

A cart includes a carriage, a right front wheel, a left front wheel, a right rear wheel and a left rear wheel, and a suspension mechanism. The suspension mechanism includes a steering shaft, a link member, a tie rod, a holding member, and a buffer member. When the cart is viewed from behind, a lower space is defined under the carriage. The lower space has a width of ⅓ or more of a distance between a left side surface of the right front wheel and a right side surface of the left front wheel between the right front wheel and the left, front wheel. The lower space between the right rear wheel and the left rear wheel has the width of ⅓ or more of the distance between a left side surface of the right rear wheel and a right side surface of the left rear wheel.

12 Claims, 33 Drawing Sheets

(56) References Cited

U.S. PATENT DOCUMENTS

| | | | | |
|---|---|---|---|---|
| 8,453,771 | B1 * | 6/2013 | Hirschfeld | B60L 8/003 |
| | | | | 180/19.1 |
| 8,505,657 | B2 * | 8/2013 | Gong | B62B 5/0043 |
| | | | | 180/907 |
| 8,523,224 | B2 * | 9/2013 | Gallagher | B62D 51/02 |
| | | | | 280/756 |
| 11,207,933 | B2 * | 12/2021 | Zhang | B60G 3/20 |
| 11,794,541 | B2 * | 10/2023 | West | B60G 11/08 |
| 11,845,484 | B2 * | 12/2023 | Wercholuk | B62B 5/005 |
| 12,030,482 | B2 * | 7/2024 | Takeda | B60W 10/18 |
| 12,030,543 | B2 * | 7/2024 | Burnett | B62B 5/0447 |
| 2009/0242284 | A1 * | 10/2009 | Whetstone, Jr. | B62D 51/04 |
| | | | | 180/19.2 |
| 2009/0242285 | A1 * | 10/2009 | Whetstone, Jr. | B62D 51/04 |
| | | | | 180/19.2 |
| 2018/0215404 | A1 * | 8/2018 | Hayashi | B62B 5/004 |
| 2018/0244294 | A1 * | 8/2018 | Ochiai | B62B 5/004 |
| 2019/0049968 | A1 * | 2/2019 | Dean | G05D 1/0255 |
| 2020/0223478 | A1 * | 7/2020 | Sano | B60G 15/062 |
| 2020/0361509 | A1 * | 11/2020 | Nonnenmacher | H01M 50/244 |
| 2021/0283783 | A1 * | 9/2021 | Gillett | G05D 1/0088 |
| 2021/0402839 | A1 * | 12/2021 | West | B60G 11/02 |
| 2021/0403078 | A1 * | 12/2021 | Sano | B60G 3/26 |

FOREIGN PATENT DOCUMENTS

| | | | | |
|---|---|---|---|---|
| CN | 111216782 A | * | 6/2020 | |
| GB | 2034648 A | * | 6/1980 | B62D 7/10 |
| GB | 2 385 838 A | | 3/2003 | |
| GB | 2 391 206 A | | 2/2004 | |
| JP | H09192174 A | * | 7/1997 | |
| JP | 2000118414 A | * | 4/2000 | |
| JP | 2003-261039 A | | 9/2003 | |

* cited by examiner

FIG. 11
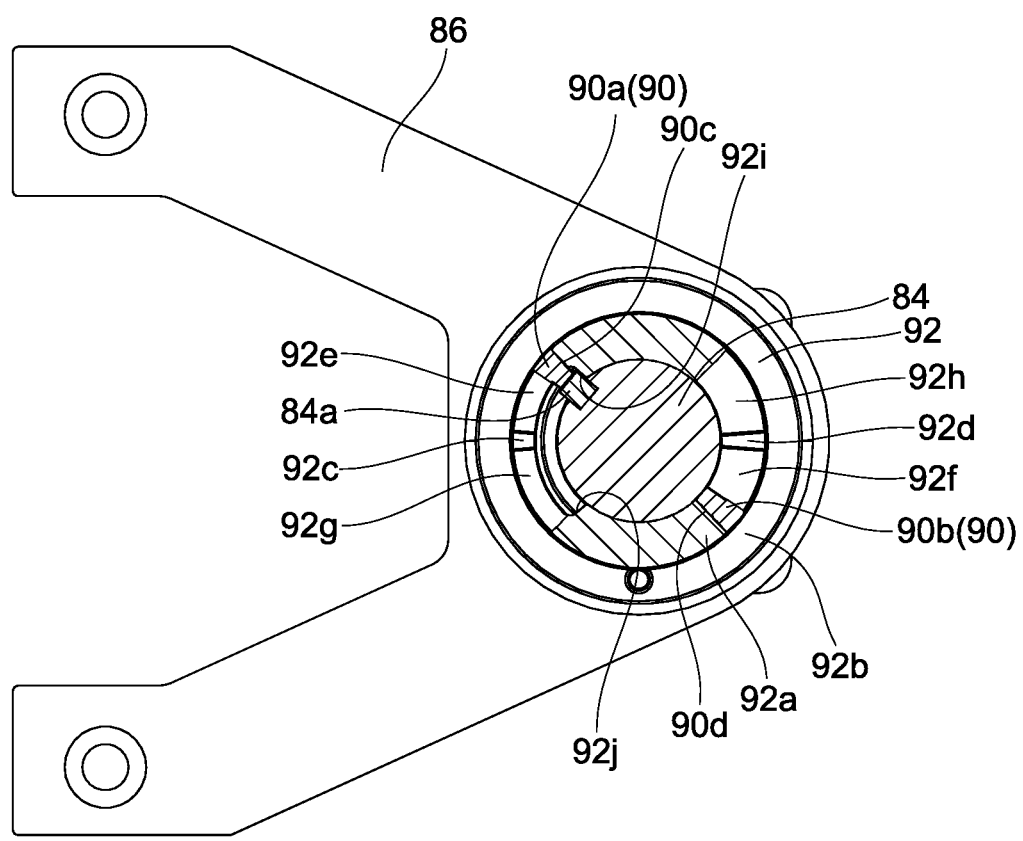
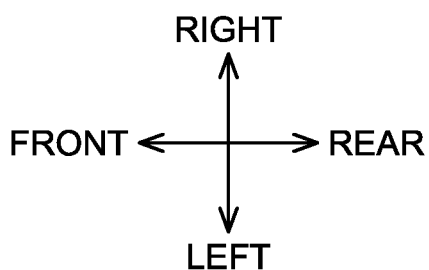

CART

CROSS-REFERENCE TO RELATED APPLICATION

This application claims priority to Japanese patent application No. 2021-117159, filed on Jul. 15, 2021, the entire contents of which are incorporated herein by reference.

TECHNICAL FIELD

The art disclosed herein relates to a cart.

BACKGROUND

Japanese Patent Application Publication No. 2003-261039 describes a vehicle. This vehicle includes: a carriage; a right front wheel, a left front wheel, a right rear wheel and a left rear wheel, each of which is supported by the carriage and touches ground; and a suspension mechanism configured to support at least one of the right front wheel, the left front wheel, the right rear wheel and the left rear wheel as a steering wheel. The suspension mechanism includes: a steering shaft configured to rotate with respect to the carriage; a link member fixed to the steering shaft; a tie rod including one end rotatably attached to the link member; a holding member to which the other end of the tie rod is rotatably attached, the holding member being rotatably supported by the carriage about a steering axis and rotatably holding the steering wheel about a rotation axis; and a buffer member interposed between the holding member and the carriage.

SUMMARY

When a vehicle as above is used as a cart for carrying luggage, there is a risk that the suspension mechanism collides with an obstacle upon travelling on the ground on which the obstacle is present. The disclosure herein provides art for suppressing such collision of a suspension mechanism of a cart with an obstacle on ground.

In one or more embodiments, a cart may comprise: a carriage; a right front wheel, a left front wheel, a right rear wheel and a left rear wheel, each of which is supported by the carriage and touches ground; and a suspension mechanism configured to support at least one of the right front wheel, the left front wheel, the right rear wheel and the left rear wheel as a steering wheel. The suspension mechanism may include: a steering shaft configured to rotate with respect to the carriage; a link member fixed to the steering shaft; a tie rod including one end rotatably attached to the link member; a holding member to which the other end of the tie rod is rotatably attached, the holding member being rotatably supported by the carriage about a steering axis and rotatably holding the steering wheel about a rotation axis; and a buffer member interposed between the holding member and the carriage. When the cart is viewed from behind, a lower space may be defined under the carriage. The lower space may extend upward from the ground. The lower space may contain a midpoint of a straight line connecting a center of the right front wheel and a center of the left front wheel. The lower space may contain a midpoint of a straight line connecting a center of the right rear wheel and a center of the left rear wheel. The lower space between the right front wheel and the left front wheel may have a width of ⅓ or more of a distance between a left side surface of the right front wheel and a right side surface of the left front wheel. The lower space between the right tear wheel and the left rear wheel may have a width of ⅓ or more of a distance between a left side surface of the right rear wheel and a right side surface of the left rear wheel.

According to the above configuration, the lower space that extends upward from the ground and has a sufficient dimension in each of front-rear, left-right, and up-down directions is defined below the carriage. Due to this, even when an obstacle is on the ground on which the cart travels, the suspension mechanism can be suppressed from colliding with the obstacle.

BRIEF DESCRIPTION OF DRAWINGS

FIG. 11 is a cross-sectional view of a lower portion of the handle unit 8 of the embodiment in a cross section along the front-rear and left-right directions in the state in which fin operation to steer the handle unit 8 to the right is performed.

DETAILED DESCRIPTION

Figure 1:
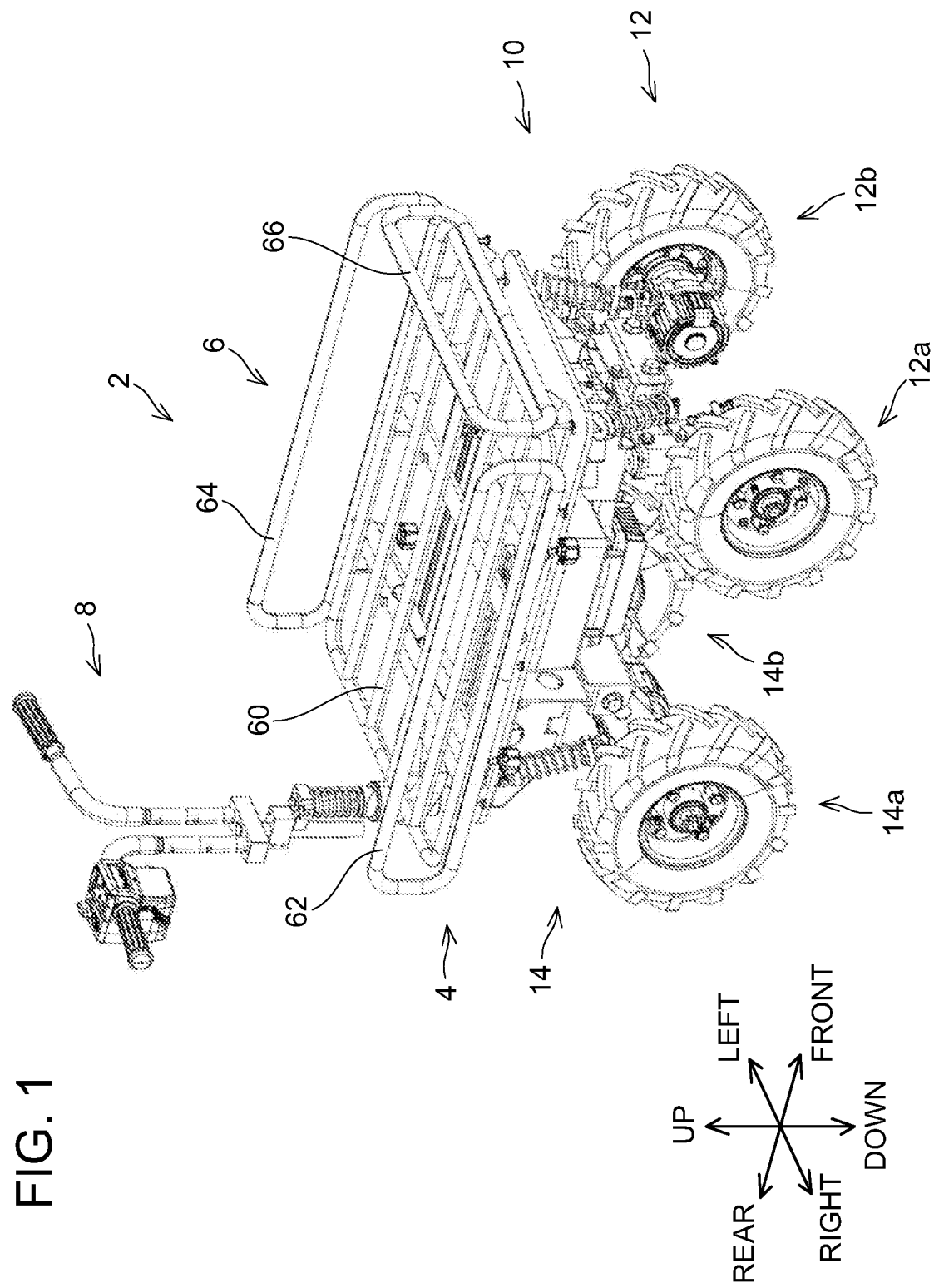
FIG. 1 is a perspective view of a cart 2 of an embodiment viewed from the front right upper side.

Representative, non limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved carts, as well as methods for using and manufacturing the same.

Moreover, combinations of features and steps disclosed in the following detailed description may not be necessary to practice the present disclosure in the broadest sense, and are instead taught, merely to particularly describe representative examples of the present disclosure, furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a cart may comprise: a carriage; a right front wheel, a left front wheel, a right rear wheel and a left rear wheel, each of which is supported by the carriage and touches ground; and a suspension mechanism configured to support at least one of the right front wheel, the left front wheel, the right rear wheel and the left rear wheel as a steering wheel. The suspension mechanism may include a steering shaft configured to rotate with respect to the carriage; a link member fixed to the steering shaft; a tie rod including one end rotatably attached to the link member; a holding member to which the other end of the tie rod is rotatably attached, the holding member being rotatably supported by the carriage about a steering axis and rotatably holding the steering wheel about a rotation axis; and a buffer member interposed between the holding member and the carriage. When the cart is viewed from behind, a lower space may be defined under the carriage. The lower space may extend upward from the ground. The lower space may contain a midpoint of a straight line connecting a center of the right front wheel and a center of the left front wheel. The lower space may contain a midpoint of a straight line connecting a center of the right rear wheel and a center of the left rear wheel. The lower space between the right front wheel and the left front wheel may have a width of ⅓ or more of a distance between a left side surface of the right front wheel and a right side surface of the left front wheel. The lower space between the right rear wheel and the left rear wheel may have a width of ⅓ or more of a distance between a left side surface of the right rear wheel and a right side surface of the left rear wheel.

According to the above configuration, the lower space that extends upward from the ground and has a sufficient dimension in each of front-rear, left-right, and up-down directions is defined below the carriage. Due to this, even when an obstacle is on the ground on which the cart travels, the suspension mechanism can be suppressed from colliding with the obstacle.

In one or more embodiments, the other end of the tie rod may be rotatably attached to the holding member above the rotation axis of the steering wheel.

According to the above configuration, the tie rod can be arranged at a higher position, and the tie rod can be suppressed from colliding with the obstacle on the ground.

In one or more embodiments, the suspension mechanism may further include a first arm member including one end rotatably attached to the carriage and the other end rotatably attached to the holding member. One end of the buffer member may be rotatably attached to the carriage. The other end of the buffer member may be rotatably attached to the first arm member.

According to the above configuration, an angle of the holding member with respect to the carriage can be suppressed from changing even when the carriage sinks with respect to the steering wheel, and a ground-touching angle of the steering wheel can be stabilized.

In one or more embodiments, the holding member may include: a kingpin extending along the steering axis; and a support member rotatably supporting the kingpin. The other end of the first arm member may be rotatably attached to the support member.

According to the above configuration, since the steering axis can be located near the steering wheel, a scrub radius of the steering wheel can be reduced, and steering performance can be improved.

In one or more embodiments, in a state where no luggage is placed on the cart and the cart is stopped, the one end of the first arm member may be positioned higher than the other end of the first arm member by a first predetermined height. In a state where the cart is in use and a maximum load allowed for the buffer member is applied to the buffer member, the one end of the first arm member may be positioned lower than the other end of the first arm member by a second predetermined height. The first predetermined height may be substantially equal to the second predetermined height.

A length of the tie rod projected to a plane perpendicular to an up-down direction increases as the carriage sinks in with respect to the steering wheel, reaches its maximum when the one end and the other end of the first arm member come to the same height, and thereafter decreases as the carriage further sinks in with respect to the steering wheel. According to the above configuration, since the length of the tie rod projected to the plane perpendicular to the up-down direction is substantially the same between the state in which the carriage is not sinking and the state in which the carriage has sunk to the maximum, a variation range of the length of the tie rod projected to the plane perpendicular to the up-down direction can be reduced.

In one or more embodiments, when the suspension mechanism is viewed from above, the tie rod and the first arm member may intersect.

According to the above configuration, the steering wheel can be steered at a greater steering angle as compared to the case in which the tie rod and the first arm member are not in such an intersecting relationship.

In one or more embodiments, the suspension mechanism may further include a second arm member different from the first arm member, and the second arm member may include one end rotatably attached to the carriage and the other end rotatably attached to the holding member.

According to the above configuration, the angle of the holding member with respect to the carriage can further be suppressed from changing even when the carriage sinks with respect to the steering wheel, and the ground-touching angle of the steering wheel can further be stabilized.

In one or more embodiments, the other end of the buffer member may be rotatably attached to a side surface of the first arm member.

According to the above configuration, a dimension of the suspension mechanism in the up-down direction can be reduced, and the lower space can be given a greater volume. Even when an obstacle is on the ground on which the cart travels, the suspension mechanism can be suppressed from colliding with the obstacle.

In one or more embodiments, the cart may further comprise a steering handle to be gripped by a user.

According to the above configuration, the steering wheel can be steered in response to an operation on the steering handle by the user.

In one or more embodiments, the cart may further comprise: an input sensor configured to detect an operation on the steering wheel by the user; and a steering motor configured to rotate the steering shaft in response to the operation by the user detected by the input sensor. The steering handle and the steering shaft may be mechanically separated.

According to the above configuration, since a mechanism for mechanically coupling the steering handle and the suspension mechanism can be omitted, a structure of the cart can be simplified.

In one or more embodiments, the cart may further comprise a wheel motor configured to rotate the right front wheel, the left, front wheel, the right rear wheel and/or the left rear wheel.

According to the above configuration, by actuating the wheel motor upon carrying luggage, workload for carrying the luggage can be reduced.

In one or more embodiments, the wheel motor may be an in-wheel motor.

According to the above configuration, the structure of the cart can further be simplified as compared to the case in which a motor other than the in-wheel motor is used as the wheel motor.

Embodiment

A cart 2 shown in FIG. 1 comprises a carriage unit 4, a luggage carrier unit 6, a handle unit 8, a steering unit 10, a front wheel unit 12, and a rear wheel unit 14. The tart 2 is configured to carry luggage placed on the luggage carrier unit 6. The cart 2 includes a receiver (not shown) incorporated in the carriage unit 4. The cart 2 is configured to operate in a manual mode of moving forward or backward in the state in which a user standing behind the handle unit 8 is gripping the handle unit 8. Alternatively, the cart 2 may operate in an automatic mode of executing a tracking operation of moving by following a beacon (not shown) which the user standing in front of the carriage unit 4 is carrying or executing a remote-controlled operation of moving in accordance with instructions from a remote controller (not shown) which the user carries, in this case, the cart 2 is configured to receive radio waves from the beacon or the remote controller using its receiver. Alternatively, the cart 2 may operate in a parking mode of locking the rear wheel unit 14 and staying immobile.

(Carriage Unit 4)

Figure 2:
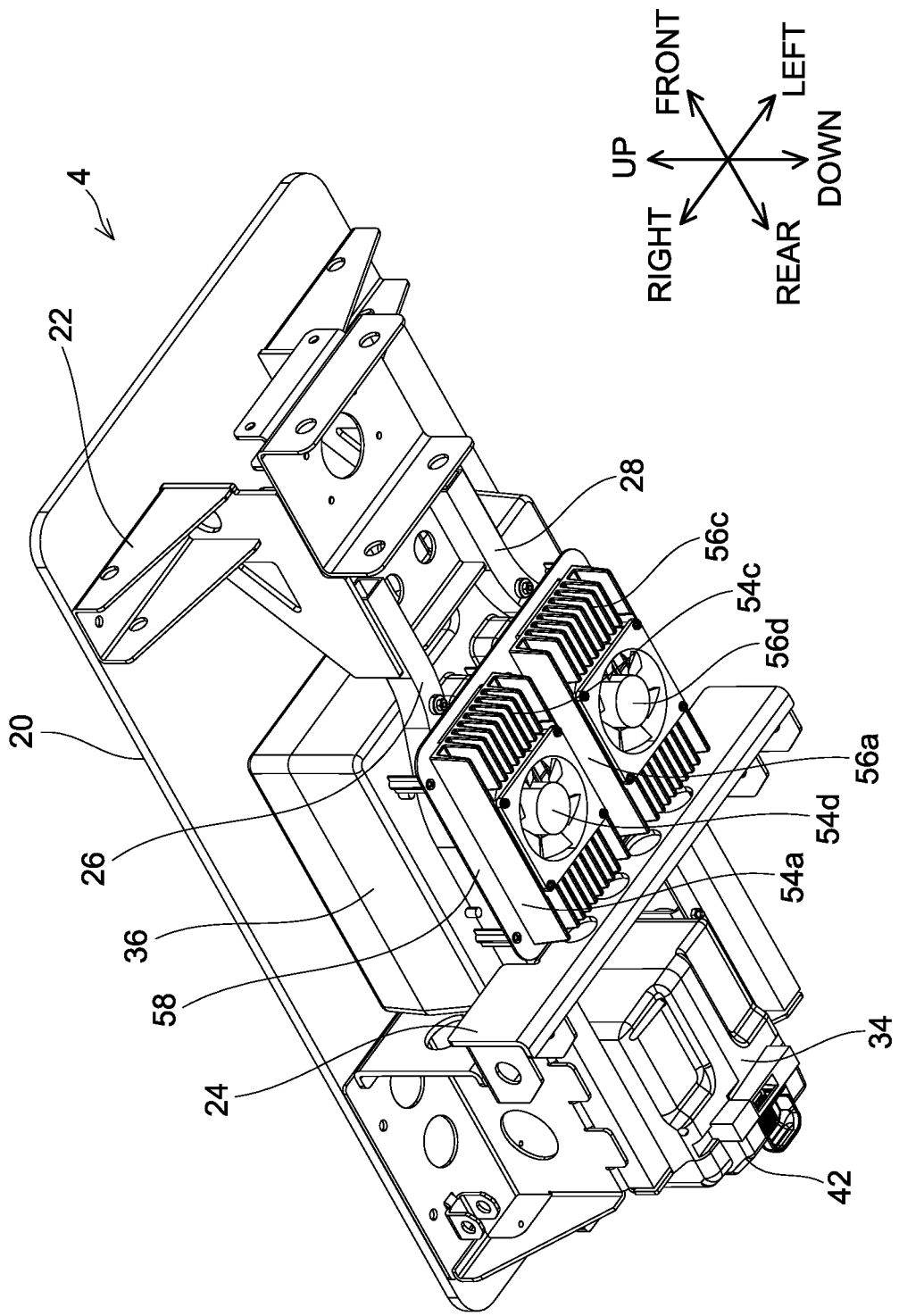
FIG. 2 is a perspective view of a carriage unit 4 of the embodiment viewed from the front right lower side.
Figure 3:
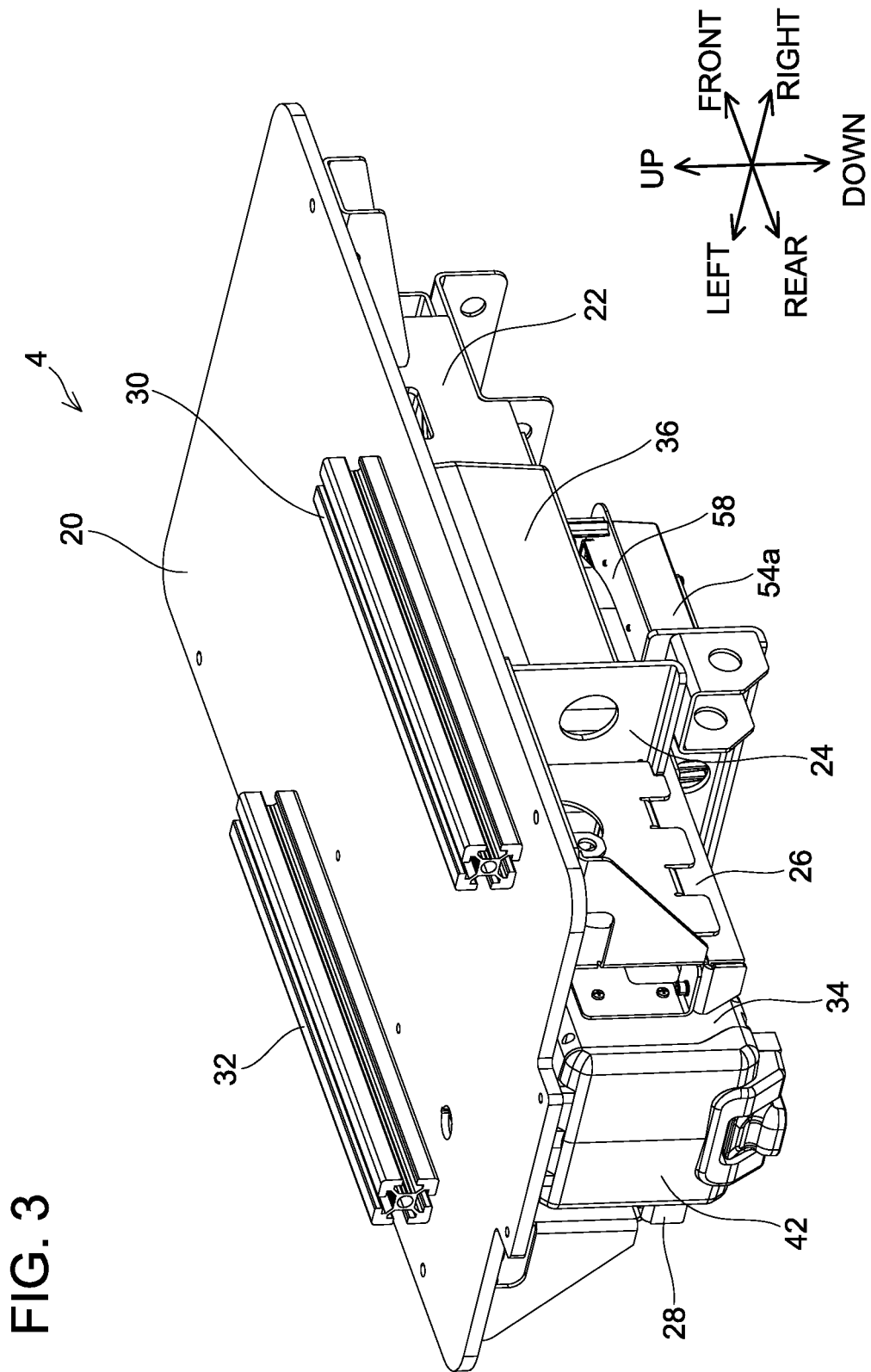
FIG. 3 is a perspective view of the carriage unit 4 of the embodiment viewed from the rear right upper side.

As shown in FIGS. 2 and 3, the carriage unit 4 comprises a base plate 20, a front support member 22, a rear support member 24, a right lower frame 26, a left lower frame 28, a right upper frame 30, a left upper frame 32, a battery box 34, and a controller casing 36. The base plate 20 is a member constituted of aluminum and has a substantially rectangular flat plate shape with its longitudinal direction extending along a front-rear direction and its short direction extending along a left-right direction. As shown in FIG. 2, the front support member 22 is a member constituted of steel and is fixed to a lower surface of the base plate 20 at a front portion of the base plate 20. The rear support member 24 is a member constituted of steel and is fixed to the lower surface of the base plate 20 at a rear portion of the base plate 20. The right lower frame 26 and the left lower frame 28 are both members constituted of steel and extend in the front-rear direction below the base plate 20. A front portion of the right lower frame 26 and a front portion of the left lower frame 28 are fixed to the front support member 22. A rear portion of the right lower frame 26 and a rear portion of the left lower frame 28 are fixed to the rear support member 24. As shown in FIG. 3, the right upper frame 30 and the left upper frame 32 axe both members constituted of aluminum and extend in the front-rear direction on or above the base plate 20. The right upper frame 30 and the left upper frame 32 are fixed to an upper surface of the base plate 20.

Figure 4:
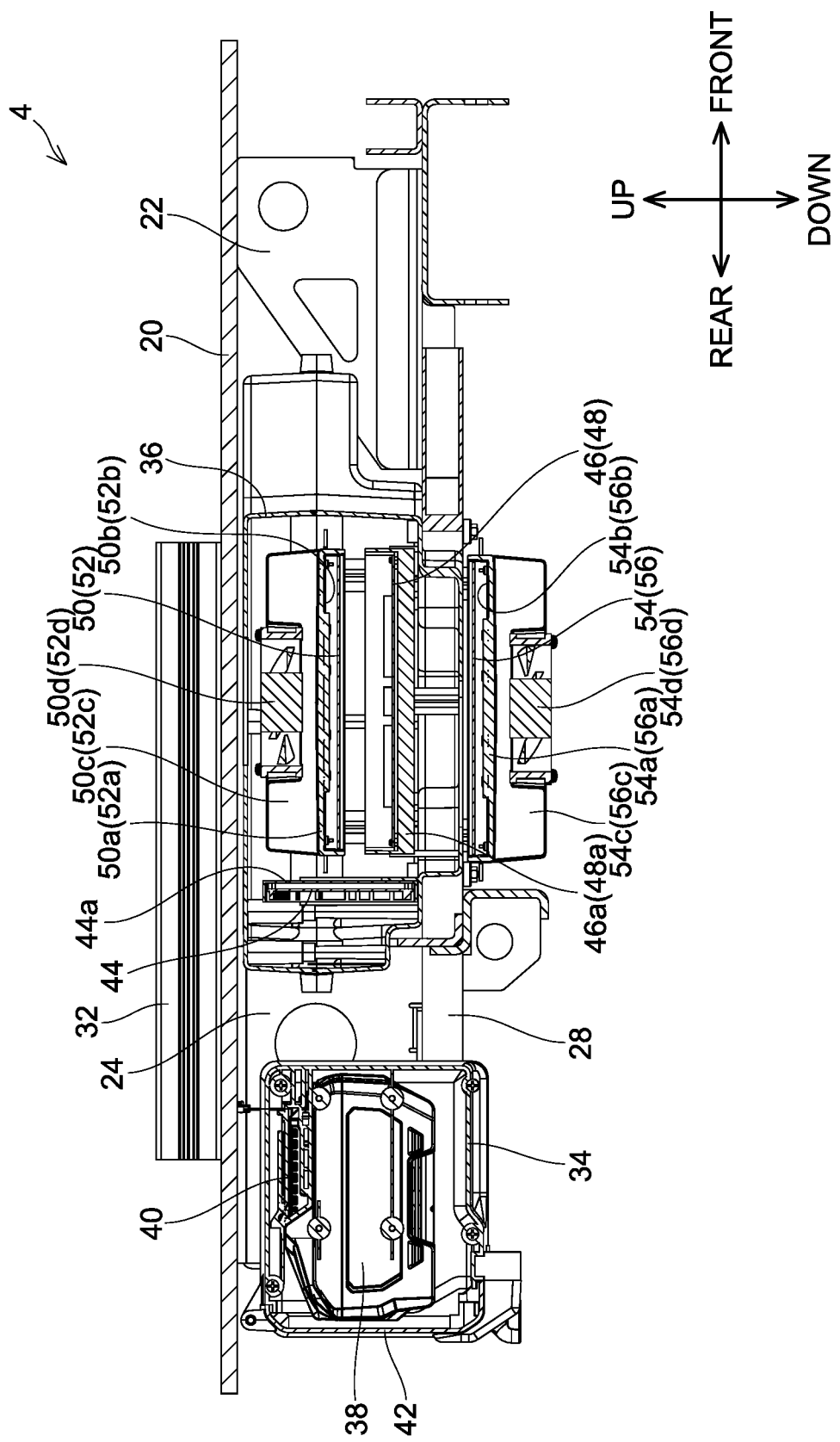
FIG. 4 is a cross-sectional view of the carriage unit 4 of the embodiment in a cross section along front-rear and up-down directions.

As shown in FIG. 3, the battery box 34 is a member constituted of resin and is arranged on or below the base plate 20 in the vicinity of the rear portion of the base plate 20. The battery box 34 is fixed to the rear support member 24. As shown in FIG. 4, battery receptacle 40 to which a battery pack 38 can be detachably attached is arranged inside, the battery box 34. The battery pack 38 includes secondary battery cells such as lithium ion battery cells. The cart 2 is configured to operate by power supplied from the battery pack 38 attached to the battery receptacle 40. An openable battery cover 42 is arranged at a rear portion of the battery box 34. The battery pack 38 can be attached to or detached from the battery receptacle 40 by sliding the battery pack 38 in the front-rear direction with respect to the battery receptacle 40 with the battery cover 42 opened.

Figure 5:
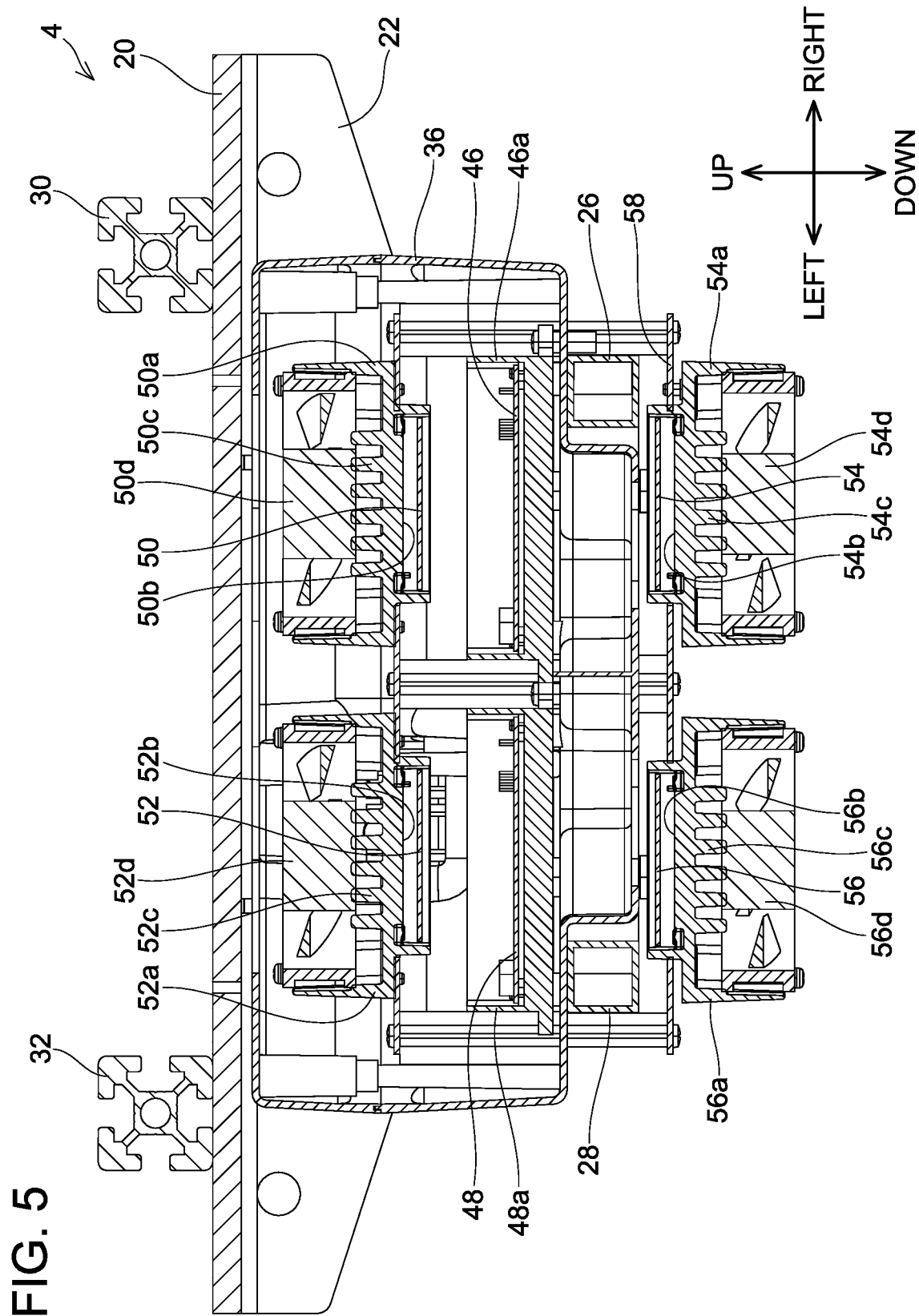
FIG. 5 is a cross-sectional view of the carriage unit 4 of the embodiment in a cross section along left-right and up-down directions.

As shown in FIG. 2, the controller casing 36 is a member constituted of resin, and is arranged on or below the base plate 20 in the vicinity of the center of the base plate 20. The controller casing 36 is fixed to the right lower frame 26 and the left lower frame 28 with the controller casing 36 placed on an upper surface of the right lower frame 26 and an upper surface of the left lower frame 28. As shown in FIGS. 4 and 5, the controller easing 36 holds one main control circuit board 44, two drive control circuit boards 46, 48, and four electrical brake circuit boards 50, 52, 54, 56.

As shown in FIG. 4, the main control circuit board 44 is housed in a circuit board easing 44a. The circuit board casing 44a is housed on the back side within the controller casing 36. The circuit board casing 44a is arranged such that the main control circuit board 44 is arranged along an up-down direction and the left-right direction. Circuits for controlling operations of the cart 2 are mounted on the main control circuit board 44.

As shown in FIG. 5, the drive control circuit boards 46, 48 are respectively housed inside circuit board casings 46a, 48a. As shown in FIG. 4, the circuit board casings 46a, 48a are housed on the front lower side within the controller casing 36. The circuit board casings 46a, 48a are arranged such that the drive control circuit hoards 46, 48 are arranged along the front-rear direction and the left-right direction. The drive control circuit boards 46, 48 are electrically connected to the main control circuit board 44. Operations of the drive control circuit boards 46, 48 are controlled by the main control circuit board 44. Circuits for controlling operations of a steering motor 176, a right front wheel motor 232, a left front wheel motor 242, a right rear wheel motor, a left rear wheeled motor, a right rear wheel electromagnetic brake, and a left rear wheel electromagnetic brake to be described later are mounted on the drive control circuit boards 46, 48.

As shown in FIG. 5, the electrical brake circuit boards 50, 52, 54, 56 are respectively mounted on heat dissipating casings 50a, 52a, 54a, 56a. The heat dissipating casings 50a, 52a, 54a, 56a respectively include circuit board housings 50b, 52b, 54b, 56b housing the electrical brake circuit boards 50, 52, 54, 56, heat dissipating fins 50c, 52c, 54c, 56c, and cooling fans 50d, 52d, 54d, 56d. The heat dissipating casings 50a, 52a are housed at a front upper portion within the controller casing 36. The heat dissipating casing 50a, 52a are arranged such that the electrical brake circuit boards 50, 52 are arranged along the front-rear direction and the left-right direction and the cooling fans 50d. 52d are oriented upward. The heat dissipating casings 54a, 56a are fixed to a heat dissipating plate 58 fixed to the controller casing 36 on the outer side of and at a front lower portion of the controller casing 36. The heat dissipating casings 54a, 56a are arranged such that the electrical brake circuit boards 54, 56 are arranged along the front-rear direction and the left-right direction and the cooling fans 54d, 56d are oriented downward. The electrical brake circuit boards 50, 54 and the cooling bins 50d, 54d are electrically connected to the drive control circuit board 46. Operations of the electrical brake circuit boards 50, 54 and the cooling fans 50d, 54d are controlled by the drive control circuit board 46. The electrical brake circuit boards 52, 56 and the cooling fans 52d, 56d are electrically connected to the drive control circuit board 48. Operations of the electrical brake circuit boards 52, 56 and the cooling fans 52d, 56d are controlled by the drive control circuit board 48. Circuits for applying electric brakes on the right front wheel motor 232, the left front wheel motor 242, the right rear wheel motor, and the left rear wheel motor to be described later are mounted respectively on the electrical brake circuit boards 50, 52, 54, 56.

(Luggage Carrier Unit 6)

As shown in FIG. 1, the luggage carrier unit 6 includes a main frame 60, a right guard 62, a left guard 64, and a front guard 66. The main frame 60, the right guard 62, the left guard 64, and the front guard 66 are constituted of round steel pipes. The main frame 60 is arranged on or above the base plate 20 of the carriage unit 4 and along the front-rear direction and the left-right direction. The main frame 60 is fixed to the right upper frame 30 and the left upper frame 32 with the main frame 60 placed on upper surfaces of the right upper frame 30 and the left upper frame 32 of the carriage unit 4. Luggage to be carried by the cart 2 is to be placed on an upper surface of the main frame 60. The right guard 62 is attached to the right end of the main frame 60 such that it protrudes higher than the upper surface of the main frame 60. The right guard 62 is arranged along the front-rear direction and the up-down direction. The left guard 64 is attached to the left end of the main frame 60 such that it protrudes higher than the upper surface of the main frame 60. The left guard 64 is arranged along the front-rear direction and the up-down direction. The front guard 66 is attached to the front end of the main frame 60 such that it protrudes higher than the upper surface of the main frame 60. The front guard 66 is arranged along the left-right direction and the up-down direction.

(Handle Unit 8)

Figure 6:
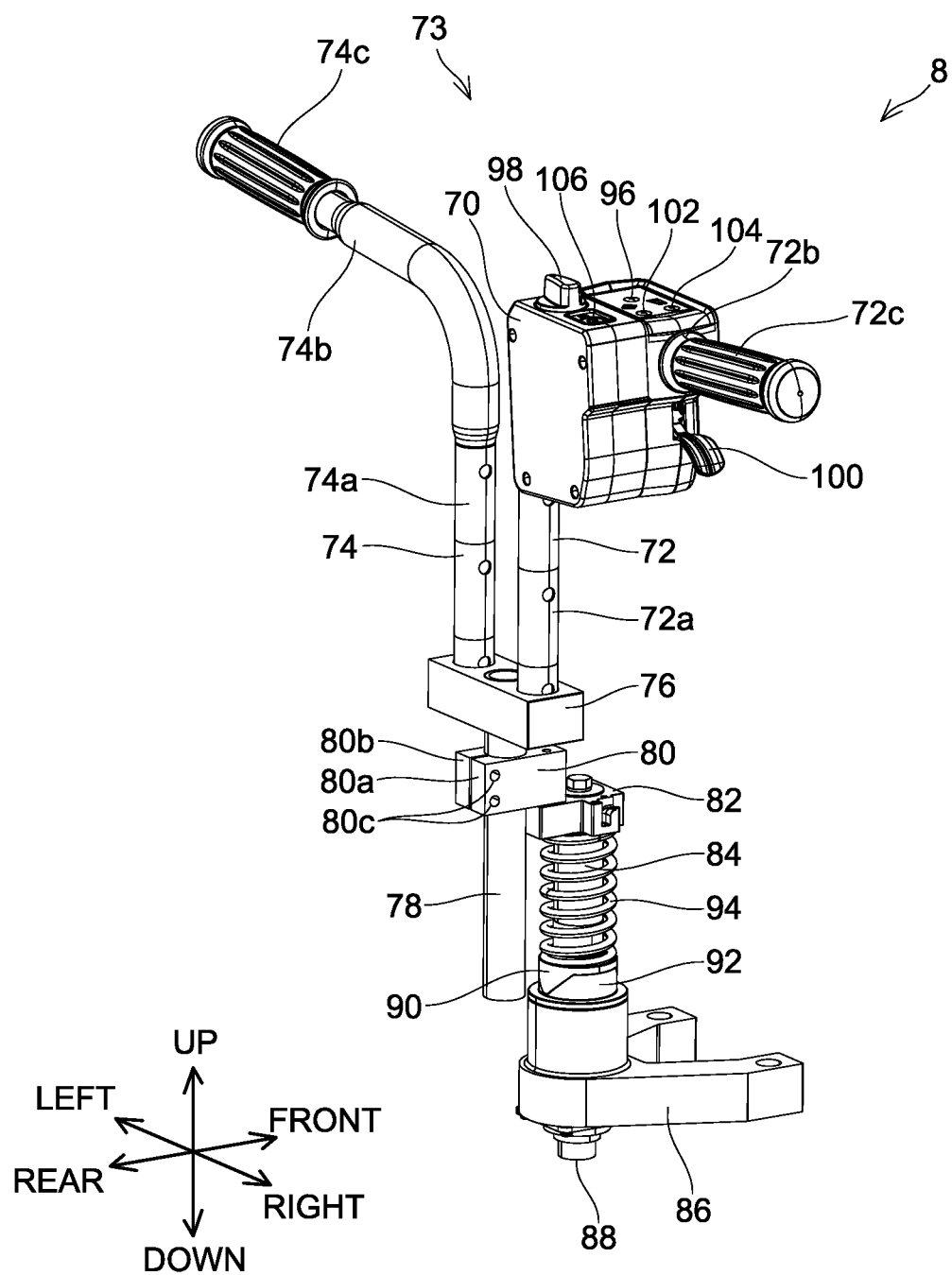
FIG. 6 is a perspective view of a handle unit 8 of the embodiment viewed from the rear right upper side.

As shown in FIG. 6, the handle unit 8 includes a switch box 70, a right handle 72, a left handle 74, a handle arm 76, a support pipe 78, a clamping member 80, a fixed member 82, a handle shaft 84, a base member 86, a rotation angle sensor 88, a movable cam member 90, a fixed cam member 92, and a coil spring 94. Hereinbelow, the right handle 72, the left handle 74, the handle arm 76, and the support pipe 78 may collectively be termed a steering handle 73.

The switch box 70 includes a main power switch 96, a mode shifter switch 98, a trigger switch 100, a travelling direction shifter switch 102, a speed shifter switch 104, and a horn switch 106. The main power switch 96 is configured to switch main power of the cart 2 between on and off. The mode shifter switch 98 is configured to switch an operation mode of the cart 2 between the manual mode, the automatic mode, and the parking mode. The trigger switch 100 is configured to switch on/off of a forward motion and a backward motion of the cart 2 and to adjust a travelling speed of the cart 2 in the manual mode. The travelling direction shifter switch 102 is configured to switch a travelling direction of the cart 2 in the manual mode. The speed shifter switch 104 is configured to switch a travelling speed of the cart 2 in the manual mode. The horn switch 106 is configured to sound a horn using a buzzer (not shown) incorporated in the switch box 70. The main power switch 96, the mode shifter switch 98, the trigger switch 100, the travelling direction shifter switch 102, the speed shifter switch 104, the horn switch 106, and the buzzer are electrically connected to the main control circuit board 44 (see FIG. 4).

The right handle 72 includes a support portion 72a extending in the up-down direction and a handle portion 72b that is bent rightward from the upper end of the support portion 72a. The lower end of the support portion 72a is fixed to the handle arm 76. A right grip 72c is arranged at the right end of the handle portion 72b. The switch box 70 is fixed to the handle portion 72b on the left side of the right grip 72c. The left handle 74 includes a support portion 74a extending in the up-down direction and a handle portion 74b that is bent leftward from the upper end of the support portion 74a. The lower end of the support portion 74a is fixed to the handle arm 76. A left grip 74c is arranged at the left end of the handle portion 74b. The upper end of the support pipe 78 is fixed to the handle arm 76. The support pipe 78 extends in the up-down direction. The clamping member 80 includes clamping parts 80a, 80b configured to clamp the support pipe 78 from both left and right sides. A tightening part 80c that is to be tightened by a tightening tool (not shown) is arranged at the rear ends of the clamping parts 80a, 80b. When the tightening tool of the tightening part 80c is tightened, the clamping parts 80a, 80b are firmly pressed against an outer surface of the support pipe 78, and the support pipe 78 is thereby fixed with respect to the clamping member 80. When the tightening tool of the tightening part 80c is loosened, the clamping parts 80a, 80b are no longer pressed against the outer surface of the support pipe 78, and the support pipe 78 thereby becomes movable in the up-down direction with respect to the clamping member 80, and also rotatable about the up-down direction. A position and an angle of the support pipe 78 with respect to the clamping member 80 can be fixed by adjusting the support pipe 78 to a desired position and angle with respect to the clamping member 80 with the tightening tool of the tightening part 80c loosened and thereafter tightening the tightening tool of the tightening part 80c.

Figure 7:
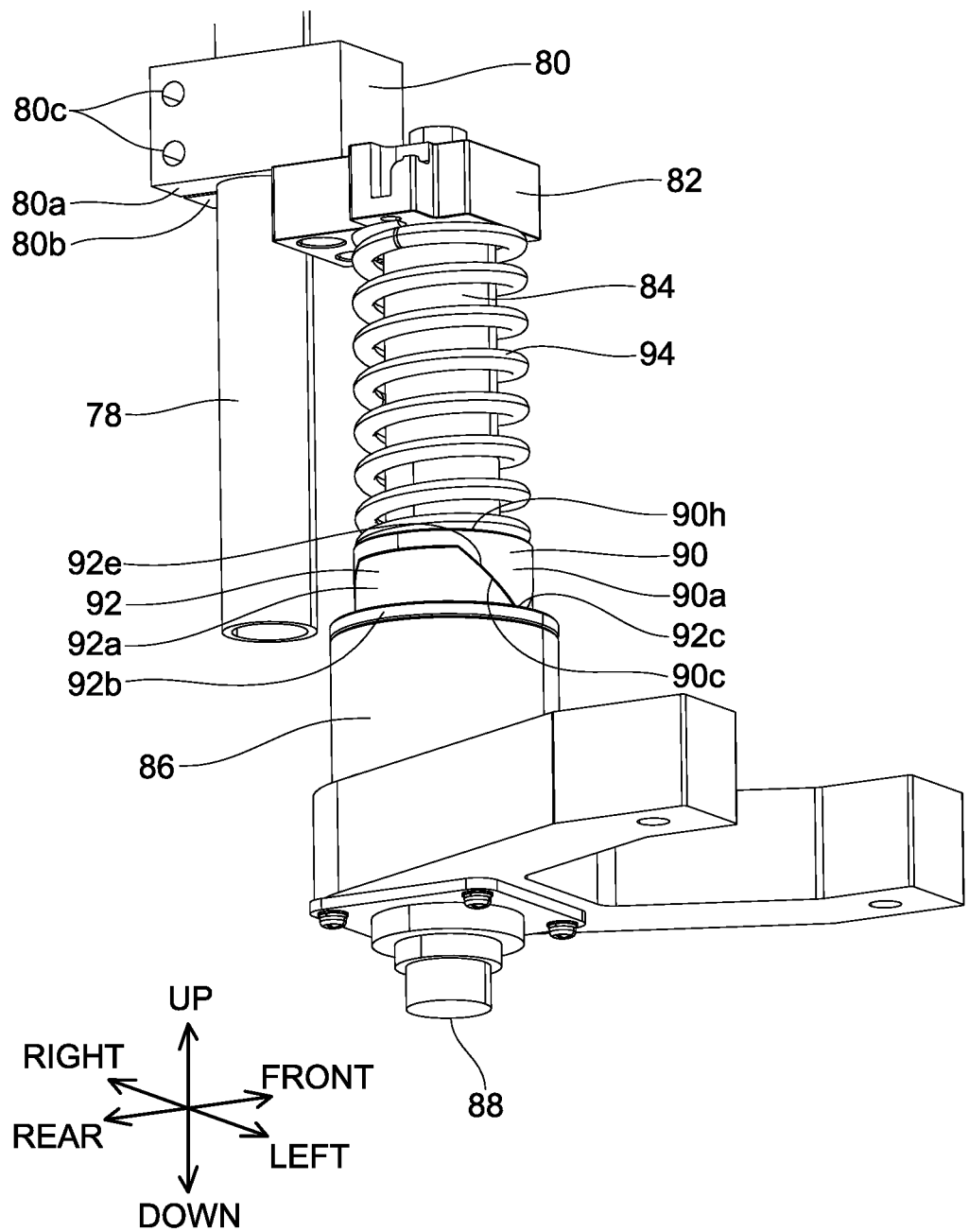
FIG. 7 is a perspective view of the handle unit 8 of the embodiment viewed from the front right lower side.

As shown in FIG. 7, a front portion of the clamping member 80 is fixed to the fixed member 82. The upper end of the handle shaft 84 is fixed to the fixed member 82. The lower end of the handle shaft 84 is rotatably supported by the base member 86. The base member 86 is fixed to the upper surface of the base plate 20 of the carriage unit 4. The rotation angle sensor 88 is fixed to a lower portion of the base member 86. The rotation angle sensor 88 is coupled to the lower end of the handle shaft 84. The rotation angle sensor 88 is configured to detect a rotation angle of the handle shaft 84 with respect to the base member 86. The rotation angle sensor 88 may for example be a potentiometer configured to detect a change in an electric resistance value that is obtained in accordance with a change in the rotation angle. Alternatively, the rotation angle sensor 88 may be a magnetic rotary sensor including a Hall element of which position is fixed with respect to the base member 86 and a permanent magnet of which position is fixed with respect to the handle shaft 84. The rotation angle sensor 88 is electrically connected to the main control circuit board 44 (see FIG. 4).

Figure 8:
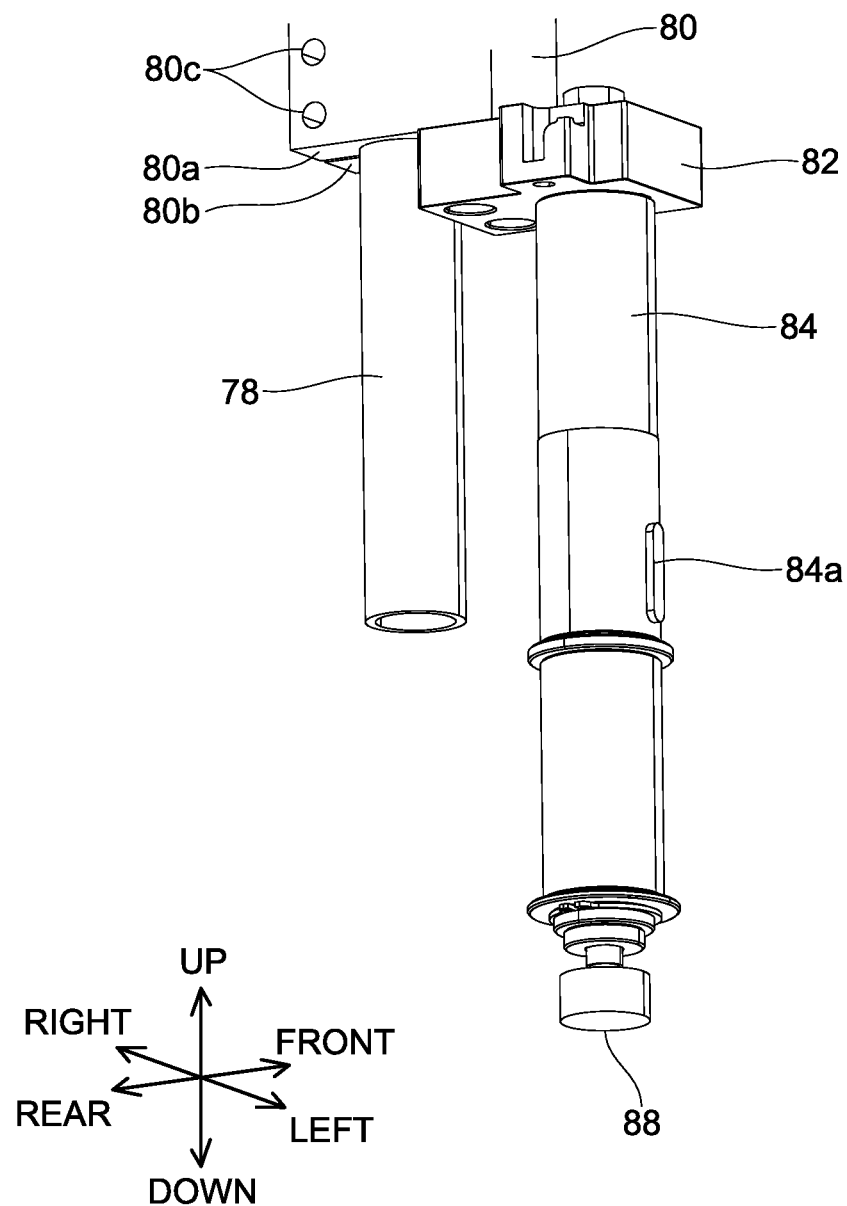
FIG. 8 is a perspective view of a support pipe 78, a clamping member 80, a fixed member 82, a handle shaft 84, and a rotation angle sensor 88 of the handle unit 8 of the embodiment viewed from the front right lower side.

As shown in FIG. 8, the handle shaft 84 includes a guiding protrusion 84a. The guiding protrusion 84a extends radially outward from an outer circumferential surface of the handle shall 84, and extends along an axial direction of the handle shaft 84.

Figure 9:
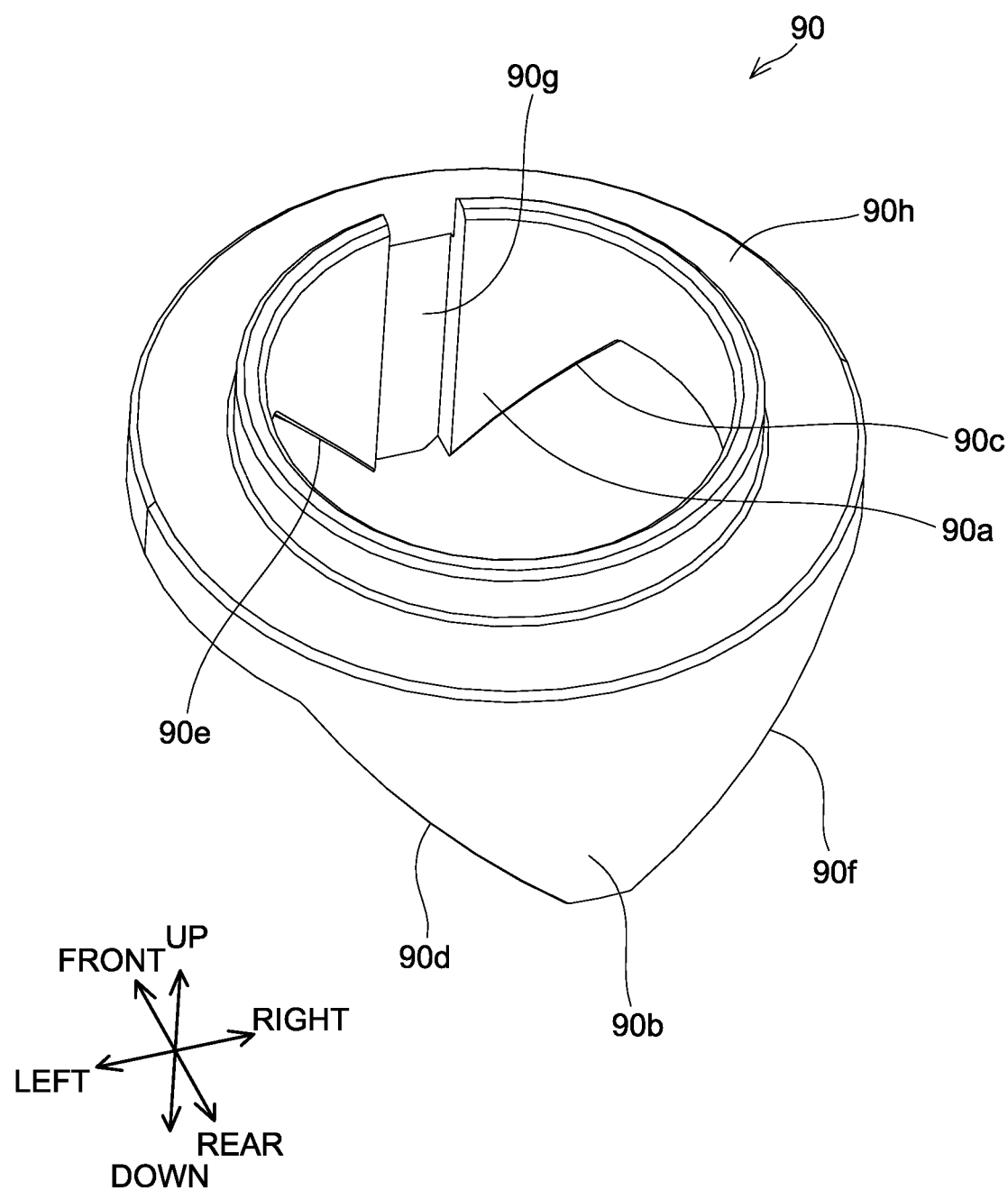
FIG. 9 is a perspective view of a movable cam member 90 of the handle unit 8 of the embodiment viewed from the rear left upper side.

As shown in FIG. 9, the movable cam member 90 has a substantially cylindrical shape. Cam projections 90a, 90b extending downward are arranged at a lower portion of the movable cam member 90. The cam projections 90a, 90b respectively include a first cam surface 90c, 90d and a second cam surface 90e, 90f. The first cam surface 90c, 90d is inclined upward along a clockwise direction in a top view of the movable cam member 90. The second cam surface 90e, 90f is inclined upward along a counterclockwise direction in the top view of the movable cam member 90. A guiding groove 90g is defined in an inner circumferential surface of the movable cam member 90. The guiding groove 90g has a width corresponding to the guiding protrusion 84a (see FIG. 8), and extends in a direction parallel to the center axis of the movable cam member 90. When the movable cam member 90 is to be attached to the handle shaft 84, the guiding protrusion 84a engages with the guiding groove 90g so that the guiding protrusion 84a can slide in the up-down direction. Due to this, the movable cam member 90 is held by the handle shaft 84 so as to be movable in the up-down direction. A spring receiving portion 90h configured to support the coil spring 94 is arranged at an upper portion of the movable cam member 90. As shown in FIG. 7, the coil spring 94 is configured to bias the movable cam member 90 downward with respect to the fixed member 82.

Figure 10:
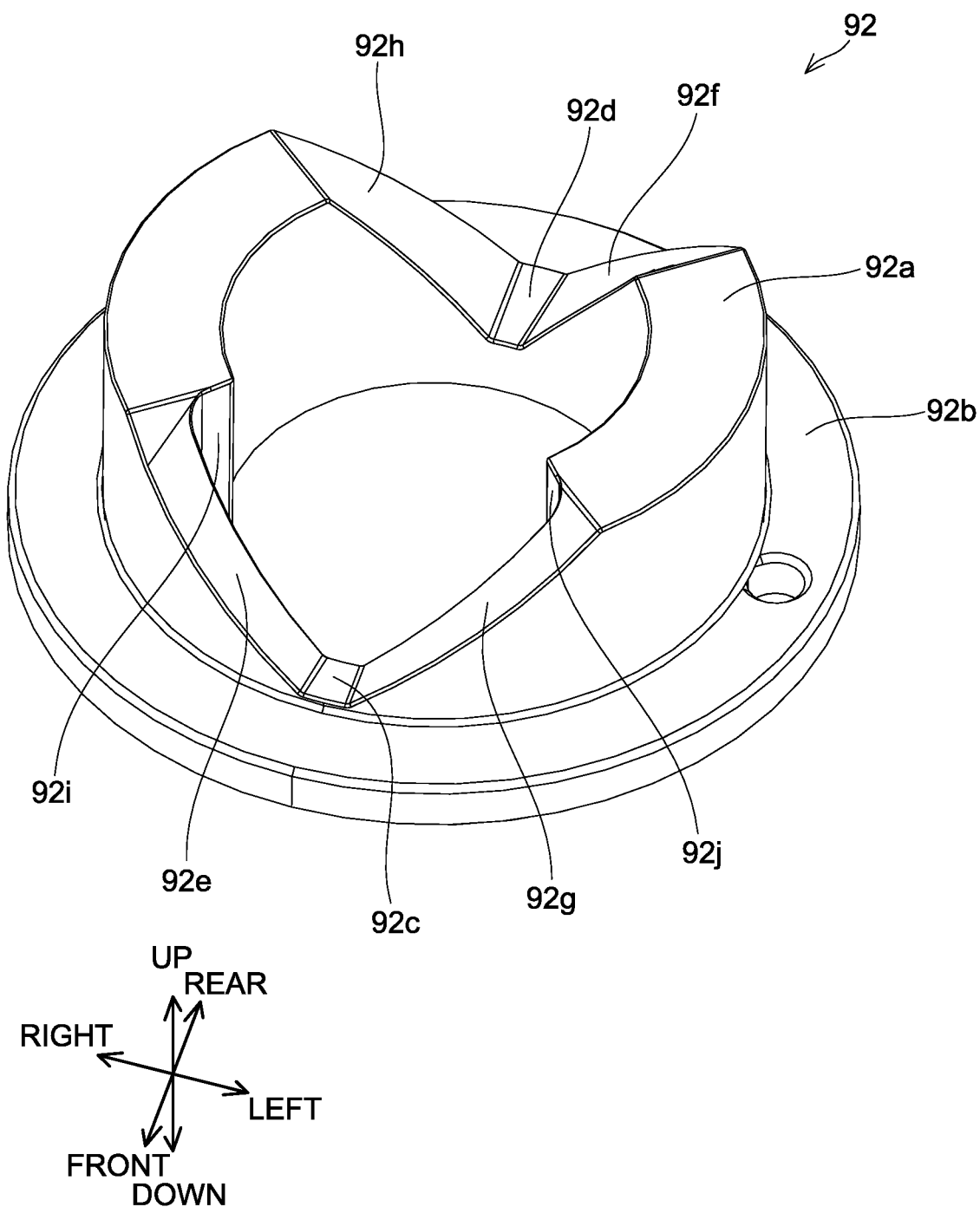
FIG. 10 is a perspective view of a fixed cam member 92 of the handle unit 8 of the embodiment viewed from the front left upper side.

As shown in FIG. 10, the fixed cam member 92 includes a cylinder portion 92a having a substantially cylindrical shape and a flange 92b extending radially outward front the lower end of the cylinder portion 92a. The fixed cam member 92 is fixed to the base member 86 by having the flange 92b fastened on an upper surface of the base member 86 (see FIG. 7) by a fastening member (not shown). Cam recesses 92c, 92d corresponding to the cam projections 90a, 90b of the movable cam member 90 are defined at an upper portion of the cylinder portion 92a. The cam recesses 92c, 92d respectively have a first cam surface 92e, 92f and a second cam surface 92g, 92h. The first cam surface 92c, 92f respectively corresponds to the first cam surface 90c, 90d of the movable cam member 90. The second cant surface 92g, 92h respectively corresponds to the second cant surface 90c, 90f of the movable cam member 90. Further, stopper portions 92i, 92j are arranged on an inner circumferential surface of the cylinder portion 92a. As shown in FIG. 11, the stopper portions 92i, 92j are configured to restrict a rotatable range of the handle shaft 84 by coming into abutment with the guiding protrusion 84a of the handle shaft 84 when the handle shaft 84 rotates with respect to the fixed cam member 92.

Figure 12:
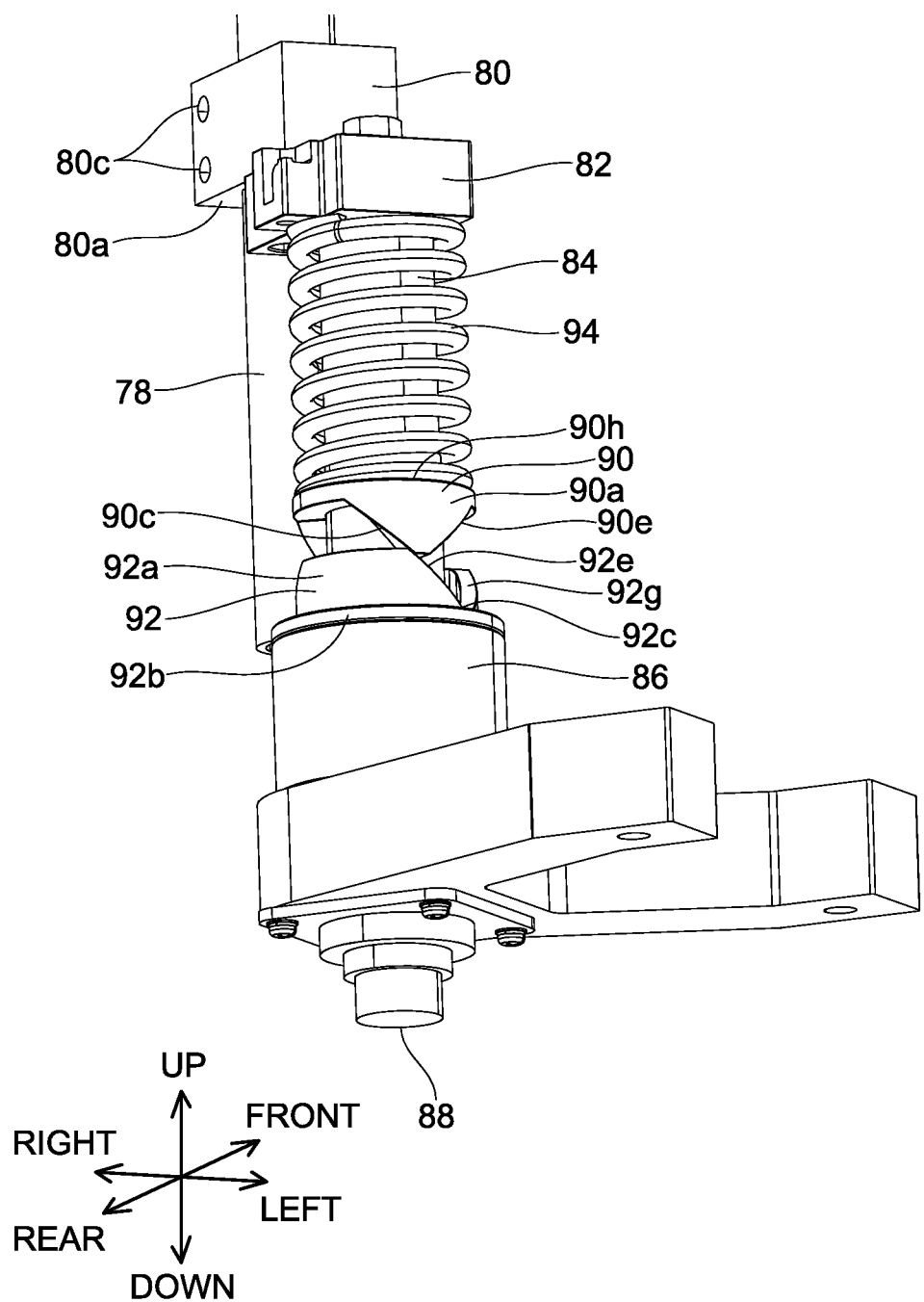
FIG. 12 is a perspective view of the lower portion of the handle unit 8 of the embodiment viewed from the front right lower side in the state in which the operation to steer the handle unit 8 to the right is performed.

In the handle unit 8 shown in FIG. 6, when the user rotates the steering handle 73 clock wise (or counterclockwise) as viewed from above, the handle shaft 84 rotates clockwise (or counterclockwise). At this occasion, as shown in FIG. 12, due to the movable cam member 90 rotating integrally with the handle shaft 84, the first cam surface 90c, 90d (or the second cam surface 90e, 90f) of the movable cam member 90 slides with respect to the first cam surface 92c, 92f (or the second cam surface 92g, 92h) of the fixed cam member 92, as a result of which the movable cam member 90 moves upward against the biasing force of the coil spring 94 as it rotates with respect to the fixed cam member 92. In this operating, torque generated by a reaction force which the movable cam member 90 receives from the fixed cam member 92 acts on the user rotating the steering handle 73.

In the handle unit 8, the fixed member 82, the handle shaft 84, the coil spring 94, the movable cam member 90, the fixed cam member 92, and the rotation angle sensor 88 are arranged coaxially. By configuring as such, dimensions of the handle unit 8 in the front-rear direction and in the left-right direction can be reduced.

(Handle Unit 108)

Figure 13:
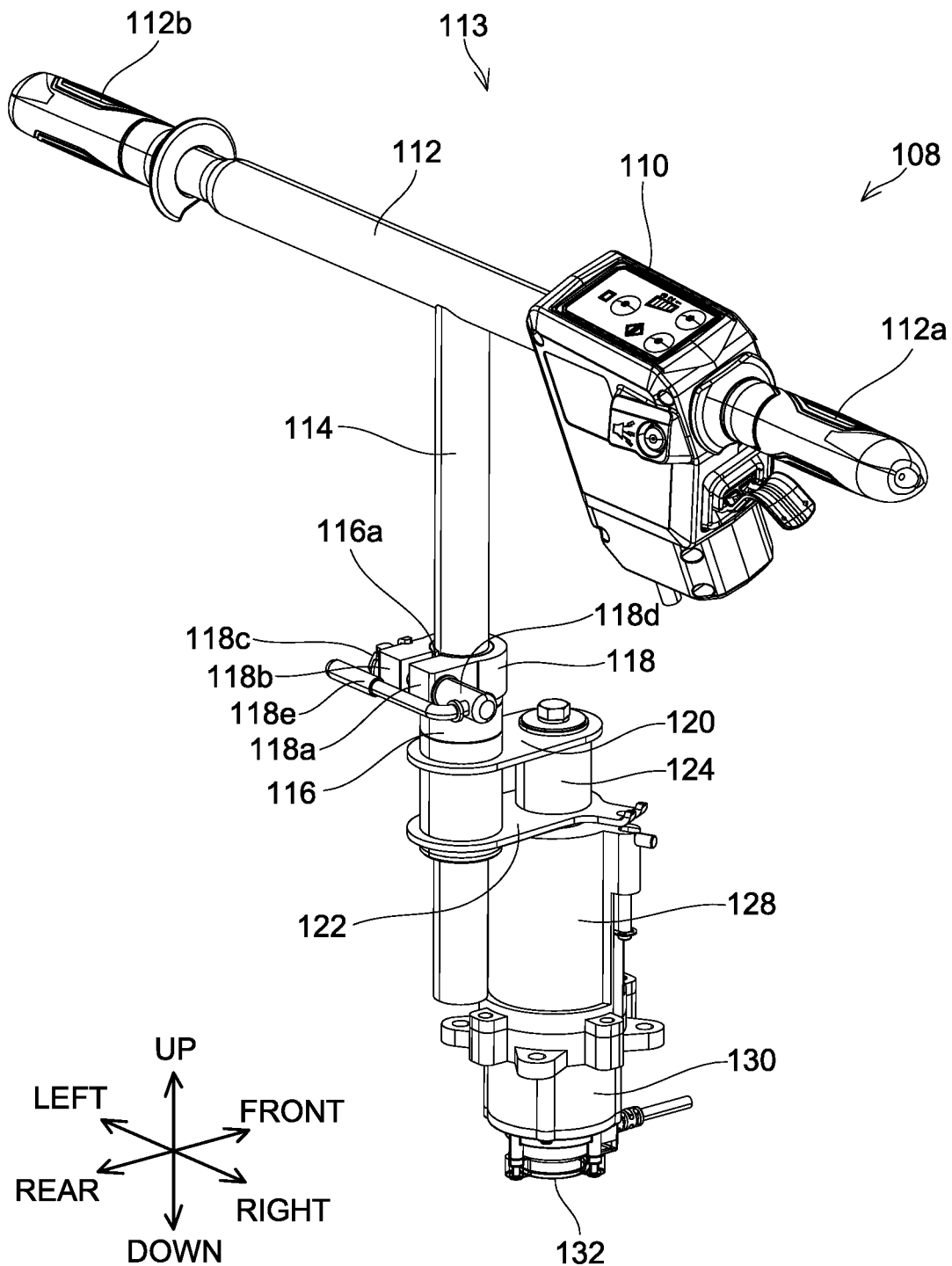
FIG. 13 is a perspective view of a handle unit 108 of a variant viewed from the rear right upper side.

The can 2 may include a handle unit 108 shown in FIGS. 13 to 19 instead of the handle unit 8. As shown in FIG. 13, the handle unit 108 includes a switch box 110, a handle bar 112, a support pipe 114, a clamping sleeve 116, a clamping member 118, an upper arm plate 120, a lower arm plate 122, a handle sleeve 124, a handle shaft 126 (see FIG. 15), a cover member 128, a base member 130, a rotation angle sensor 132, a slide sleeve 134 (see FIG. 15), and a coil spring 136 (see FIG. 15). Hereinbelow, the handle bar 112 and the support pipe 114 may collectively be termed a steering handle 113.

Figure 14:
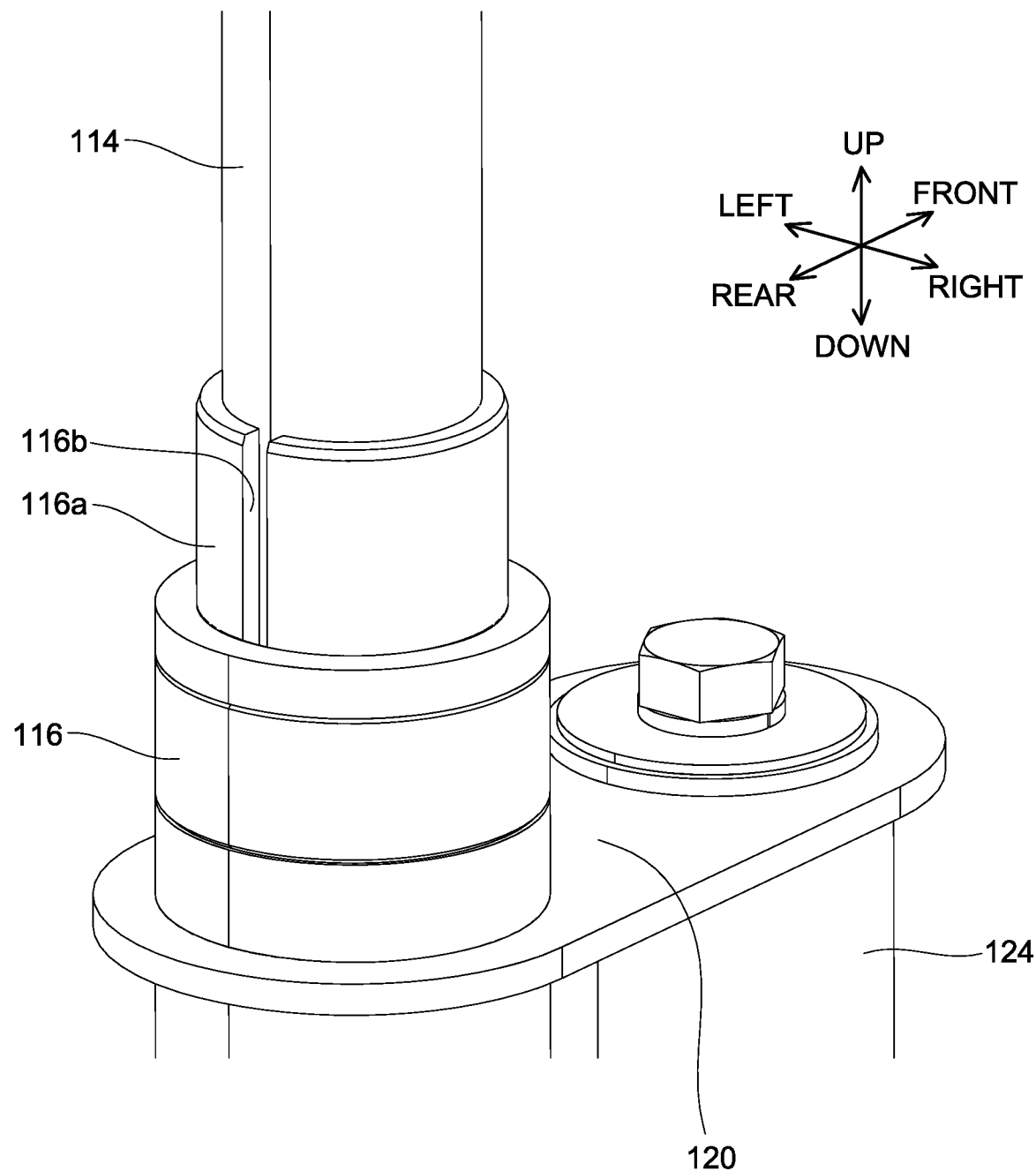
FIG. 14 is a perspective view of a support pipe 114, a clamping sleeve 116, an upper arm plate 120, and a handle sleeve 124 of the handle unit 108 of the variant viewed from the rear right upper side.

The handle bar 112 extends in the left-right direction. A right grip 112a is arranged at the right end of the handle bar 112. The switch box 110 is fixed to the handle bar 112 in the vicinity of the right grip 112a. The switch box 110 has a substantially the same configuration as the switch box 70 of the handle unit 8. A left grip 112b is arranged at the left end of the handle bar 112. The upper end of the support pipe 114 is fixed to the center of the handle bar 112. The support pipe 114 extends in the up-down direction. The support pipe 114 penetrates through the clamping sleeve 116. As shown in FIG. 14, a clamping portion 116a is arranged at the upper end of the clamping sleeve 116. The clamping portion 116a includes a slit 116b extending downward from the upper end of the clamping portion 116a. As shown in FIG. 13, the damping member 118 includes clamping parts 118a, 118b configured to clamp the clamping portion 116a of the clamping sleeve 116 from both left and right sides. A bolt 118c and a nut 118d are attached to the rear ends of the clamping parts 118a, 118b. The bolt 118c penetrates through rear portions of the clamping parts 118a, 118b. The nut 118d is screw-fastened to the distal end of the bolt 118c. A pin 118e is arranged on the nut 118d. The nut 118d can be rotated with respect to the bolt 118c by lifting the pin 118e and rotating the pin 118e with respect to the bolt 118c. When the nut 118d is tightened onto the bolt 118c, the clamping parts 118a, 118b are firmly pressed against an outer surface of the clamping portion 116a of the clamping sleeve 116, and an inner surface of the clamping portion 116a is thereby pressed firmly against an outer surface of the support pipe 114. The support pipe 114 is thereby fixed with respect to the clamping sleeve 116. When the nut 118d is loosened from the bolt 118c, the clamping parts 118a, 118b are no longer pressed against the outer surface of the clamping sleeve 116, and the inner surface of the clamping portion 116a is no longer pressed against the outer surface of the support pipe 114. Due to this, the support pipe 114 thereby becomes movable in the up-down direction with respect to the clamping sleeve 116, and also rotatable about the up-down direction. A position and an angle of the support pipe 114 with respect to the clamping sleeve 116 can be fixed by adjusting the support pipe 114 to a desired position and angle with respect to the clamping sleeve 116 with the nut 118d loosened from the bolt 118c, and thereafter tightening the nut 118d onto the bolt 118c.

Figure 15:
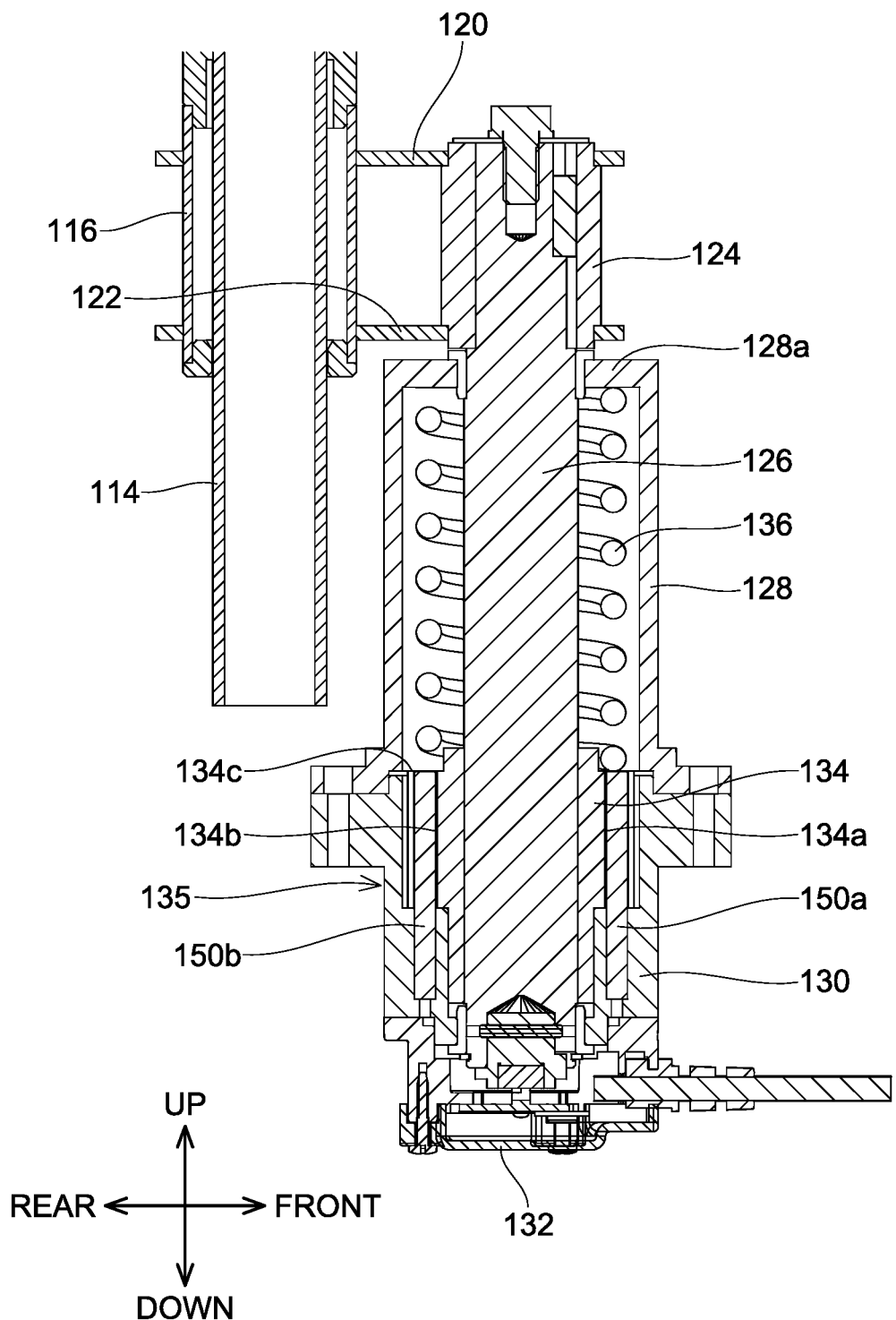
FIG. 15 is a cross-sectional view of a lower portion of the handle unit 108 of the variant in a cross section along the front-rear and up-down directions.

As shown in FIG. 15, the upper arm plate 120 couples the clamping sleeve 116 to the handle sleeve 124. The lower arm plate 122 couples the clamping sleeve 116 to the handle sleeve 124 at a position lower than the upper arm plate 120. The handle sleeve 124 is fixed to the upper end of the handle shaft 126. The handle shaft 126 penetrates through the cover member 128 and the base member 130. The cover member 128 rotatably supports the handle shaft 126 at the upper end of the cover member 128. The base member 130 rotatably supports the handle shaft 126 at the lower end of the base member 130. The cover member 128 is fixed to the base member 130. The base member 130 is fixed to the upper surface of the base plate 20 (see FIG. 3) of the carriage unit 4. The rotation angle sensor 132 is fixed to a lower portion of the base member 130. The rotation angle sensor 132 is coupled to the lower end of the handle shaft 126. The rotation angle sensor 132 is configured to detect a rotation angle of the handle shaft 126 with respect to the base member 130. The rotation angle sensor 132 may for example be a potentiometer configured to detect a change in an electric resistance value that is obtained in accordance with a change in the rotation angle. Alternatively, the rotation angle sensor 132 may be a magnetic rotary sensor including a Hall element of which position is fixed with respect to the base member 130 and a permanent magnet of which position is fixed with respect to the handle shaft 126. The rotation angle sensor 132 is electrically connected to the main control circuit board 44 (see FIG. 4).

Figure 16:
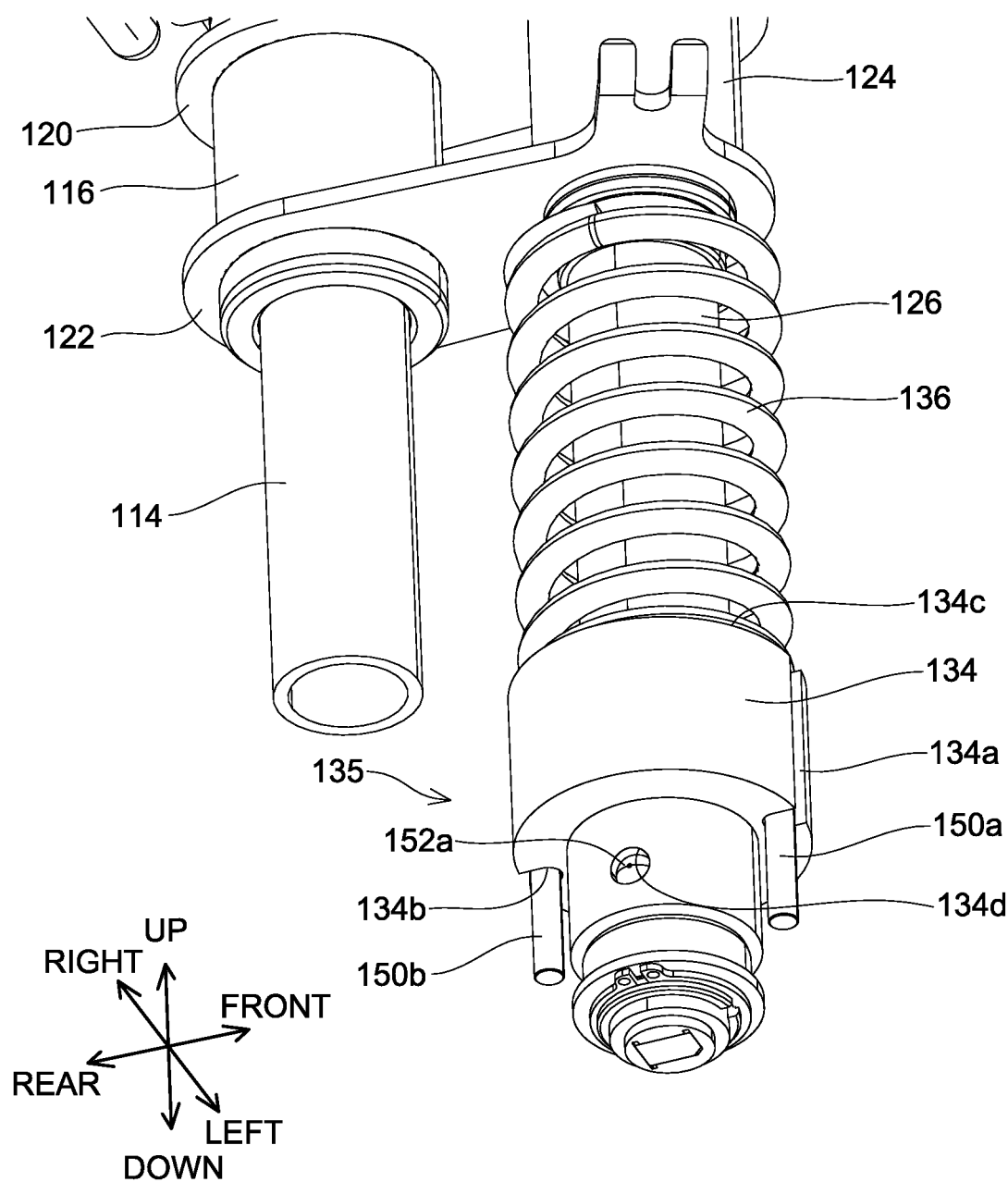
FIG. 16 is a perspective view of the support pipe 114, the clamping sleeve 116, the upper arm plate 120, a lower arm plate 122, the handle sleeve 124, a handle shaft 126, a slide sleeve 134, and a coil spring 136 of the handle unit 108 of the variant viewed from the front right lower side.

The slide sleeve 134 is attached to the handle shaft 126 inside the cover member 128 and the base member 130 so as to cover an outer peripheral surface of the handle shaft 126. As shown in FIG. 16, the slide sleeve 134 includes guiding grooves 134a, 134b, spring receiving portions 134c, and ball holding holes 134d, 134e (see FIG. 17). The guiding grooves 134a, 134b are depressed radially inward from an outer peripheral surface of the slide sleeve 134 and extends along the up-down direction. Guide pins 150a, 150b extending in the up-down direction are slidably engaged with the guiding grooves 134a, 134b. As shown in FIG. 15, lower portions of the guide pins 150a, 150b are fixed to the base member 130. Due to this, the slide sleeve 134 is supported so that the slide sleeve 134 is movable in the up-down direction with respect to the base member 130. The spring receiving portion 134c supports the lower end of the coil spring 136. The coil spring 136 is arranged inside the cover member 128 and the base member 130, and is configured to bias the slide sleeve 134 downward with respect to the cover member 128. In the description below, a portion at an upper portion of the cover member 128 that supports the upper end of the coil spring 136 may be termed a fixed member 128a.

Figure 17:
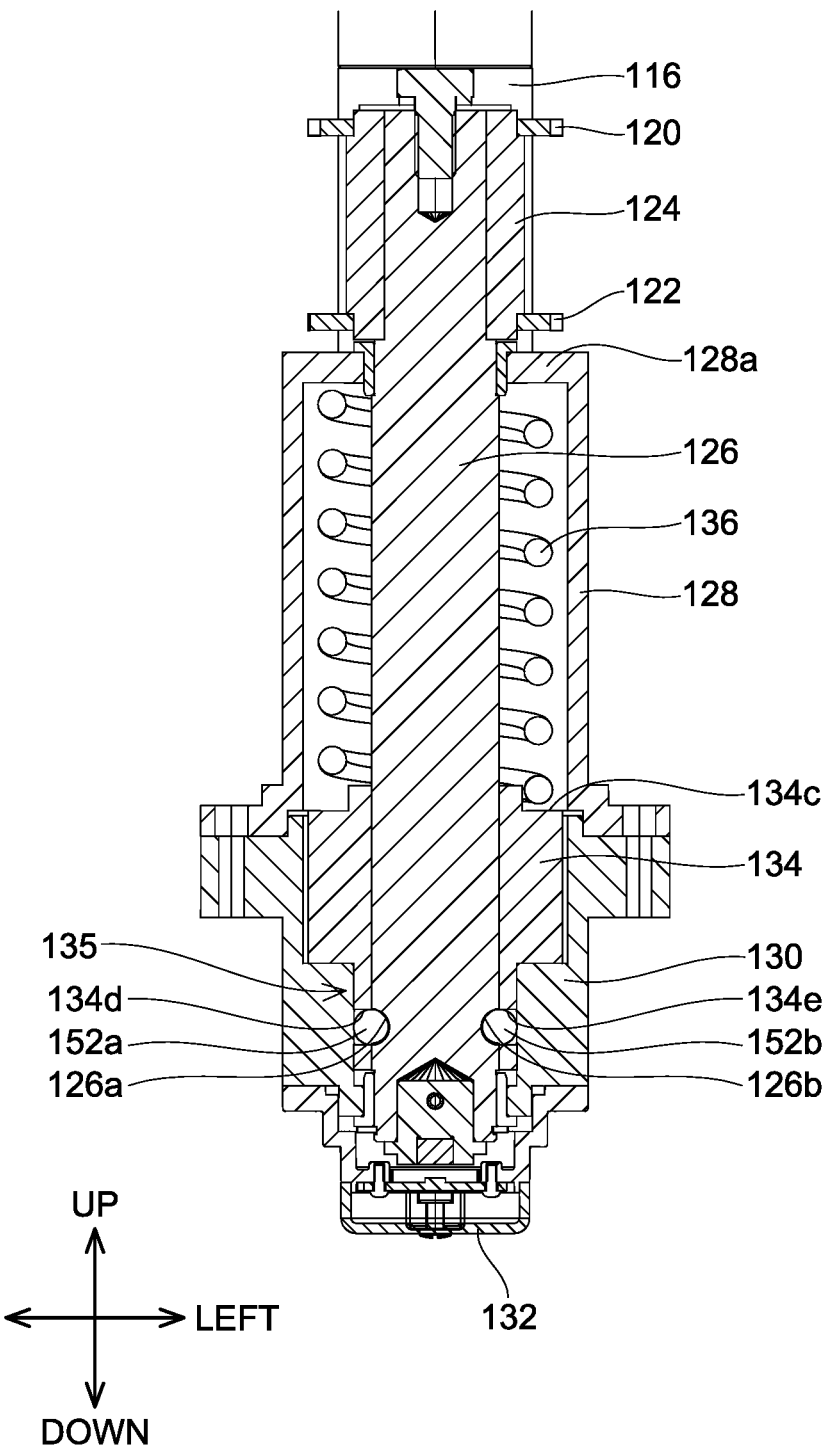
FIG. 17 is a cross-sectional view of the lower portion of the handle unit 108 of the embodiment in a cross section along the left-right and up-down directions.
Figure 18:
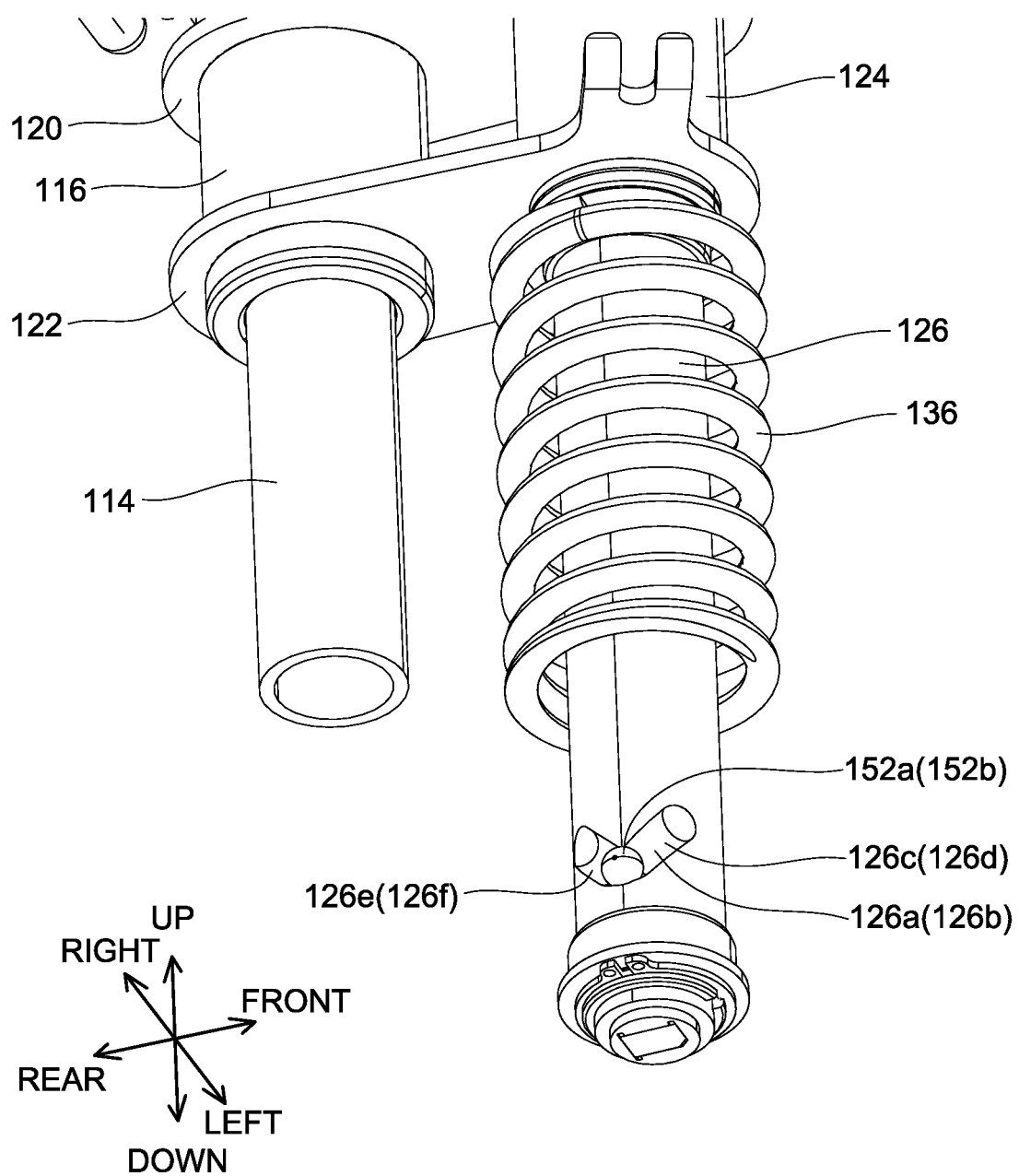
FIG. 18 is a perspective view of the support pipe 114, the clamping sleeve 116, the upper arm plate 120, the lower arm plate 122, the handle sleeve 124, the handle shaft 126, and the coil spring 136 of the handle unit 108 of the variant viewed from the front right lower side.

As shown in FIG. 17, balls 152a, 152b are placed inside the ball holding holes 134d, 134e from the inner side. An inner diameter of the hall holding holes 134d, 134c is slightly larger than an outer diameter of the balls 152a, 152b. Since outside of the ball holding holes 134d, 134e is covered by the base member 130, the hall holding holes 134d, 134e rotatably hold the balls 152a, 152b. The balls 152a, 152b are further placed inside ball grooves 126a, 126b defined in the outer peripheral surface of the handle shaft 126 from the outer side. As shown in FIG. 18, the ball grooves 126a, 126b each have a first ball groove 126c, 126d inclined upward from a lower portion along the counterclockwise direction when the handle shaft 126 is viewed from above, and a second ball groove 126c, 126f inclined upward from a lower portion along the clockwise direction in the same top view. The balls 152a, 152b are respectively rotatable along the first ball grooves 126c, 126d and the second ball grooves 126e, 126f. In the following description, the slide sleeve 134 and the balls 152a, 152b may collectively be termed a movable cam member 135 (see FIG. 17).

Figure 19:
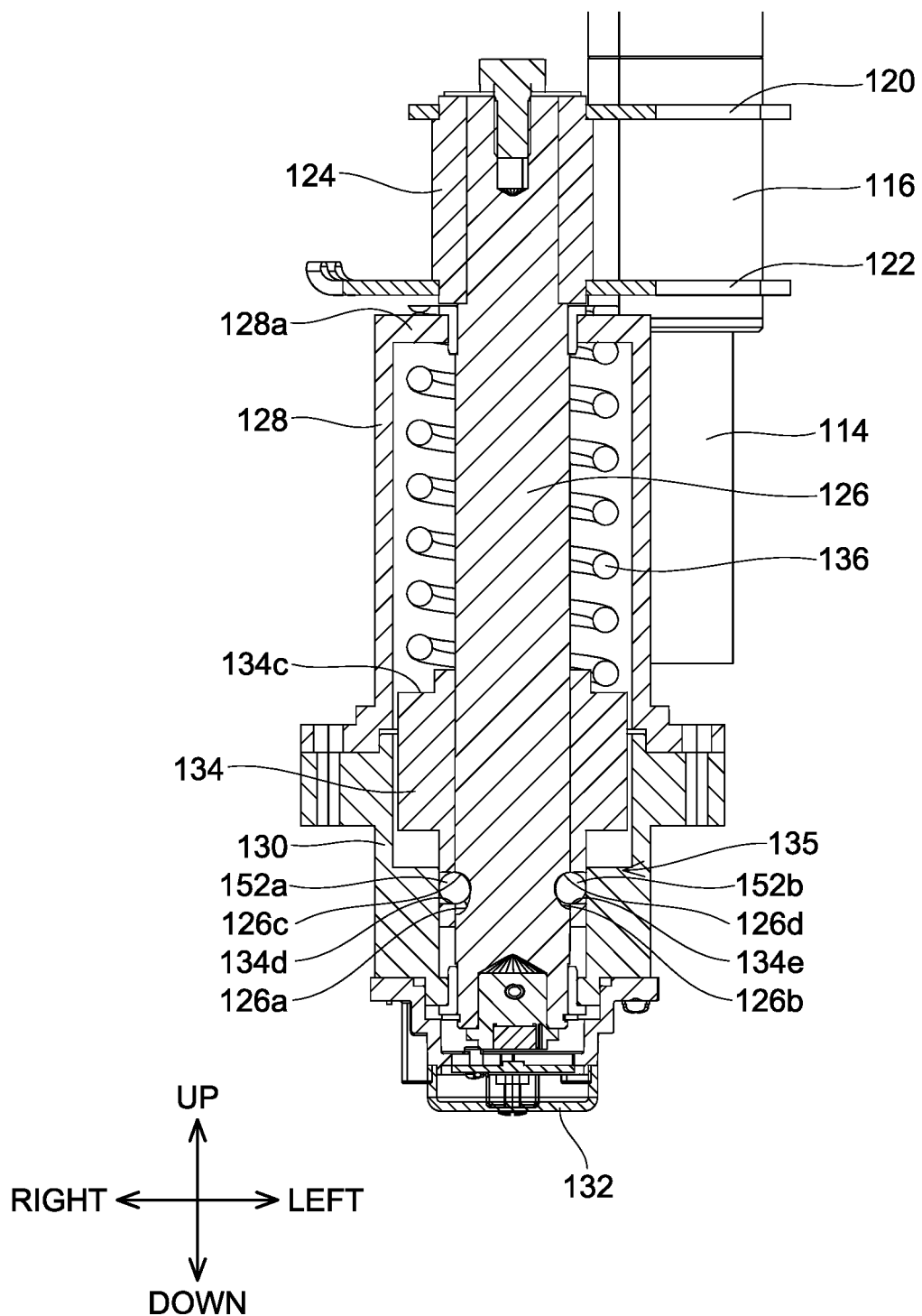
FIG. 19 is a cross-sectional view of the lower portion of the handle unit 108 of the variant in a cross section along the left-right and up-down directions in the state in which an operation to steer the handle unit 108 to the right is performed.

In the handle unit 108 shown in FIG. 13, when the user rotates the steering handle 113 clockwise (or counterclockwise) as viewed from above, the handle shaft 126 rotates clockwise (or counterclockwise). At this occasion, as shown in FIG. 19, due to the balls 152a, 152b held in the ball holding holes 134d, 134c rolling in the first ball grooves 126c, 126d (or second ball grooves 126c, 126f) of the handle shaft 126, the slide sleeve 134 moves upward against the biasing force of the coil spring 136. In this operation, torque generated by a reaction force which the handle shaft 126 receives from the slide sleeve 134 through the balls 152a, 152b acts on the user rotating the steering handle 113.

In the handle unit 108, the fixed member 128a, the handle shaft 126, the coil spring 136, the movable cam member 135, and the rotation angle sensor 132 are arranged coaxially. By configuring as such, dimensions of the handle unit 108 in the front-rear direction and in the left-right direction can be reduced. Further, in the handle unit 108, majority of the handle shaft 126 and peripheries of the coil spring 136 and the movable cam member 135 are covered by the cover member 128 and the base member 130. By configuring as such, operational failures caused by mud and water adhering to the handle shaft 126, the coil spring 136, and the movable cam member 135 can be suppressed.

(Steering Unit 10)

Figure 20:
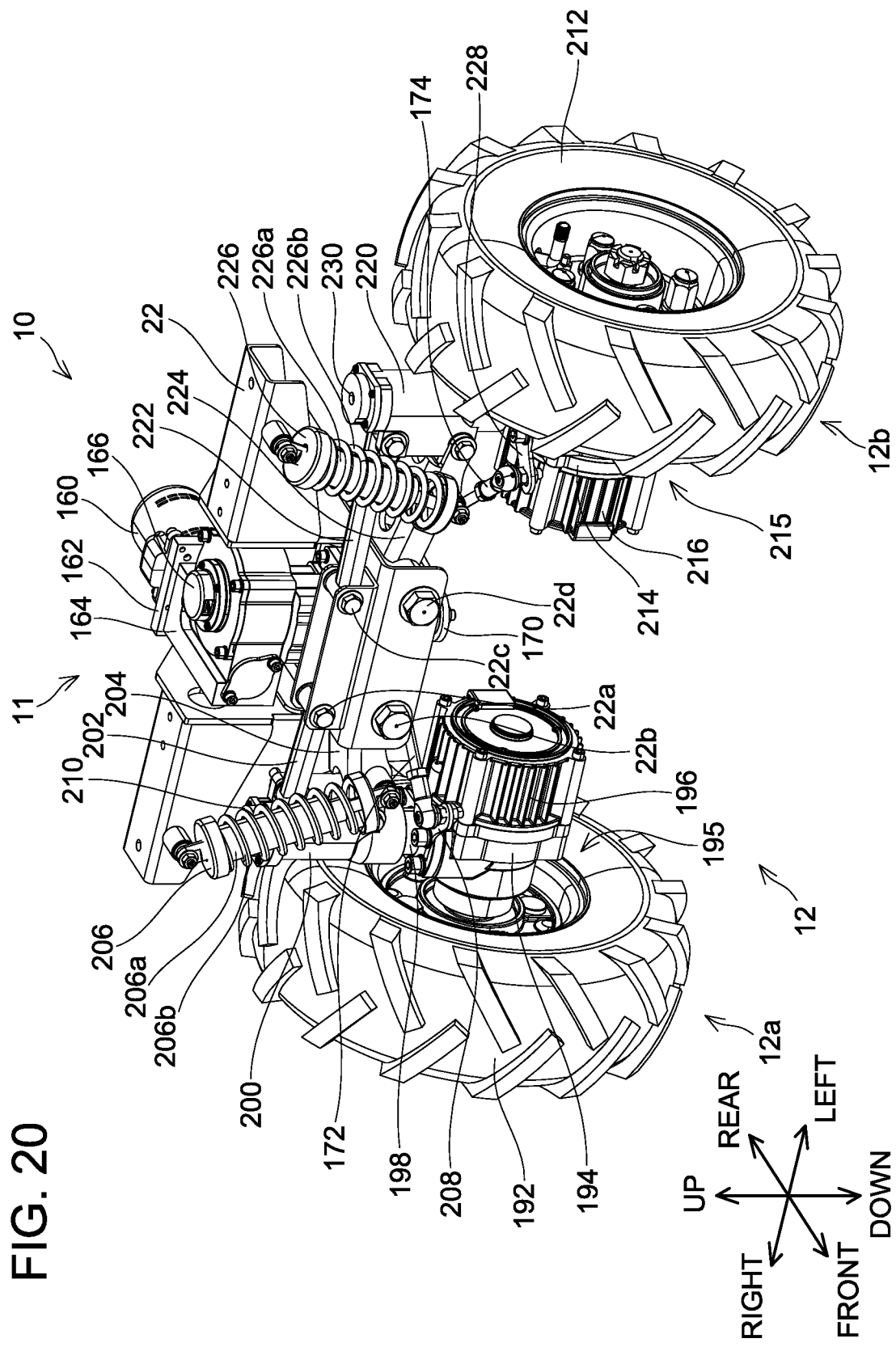
FIG. 20 is a perspective view of a steering unit 10 and a front wheel unit 12 of the embodiment viewed from the front left upper side.

As shown in FIG. 20, the steering unit 10 is attached to the front support member 22 at a front lower portion of the base plate 20 of the carriage unit 4 (see FIG. 2). The steering unit 10 is linked to the front wheel unit 12, and is configured to steer the front wheel unit 12.

Figure 21:
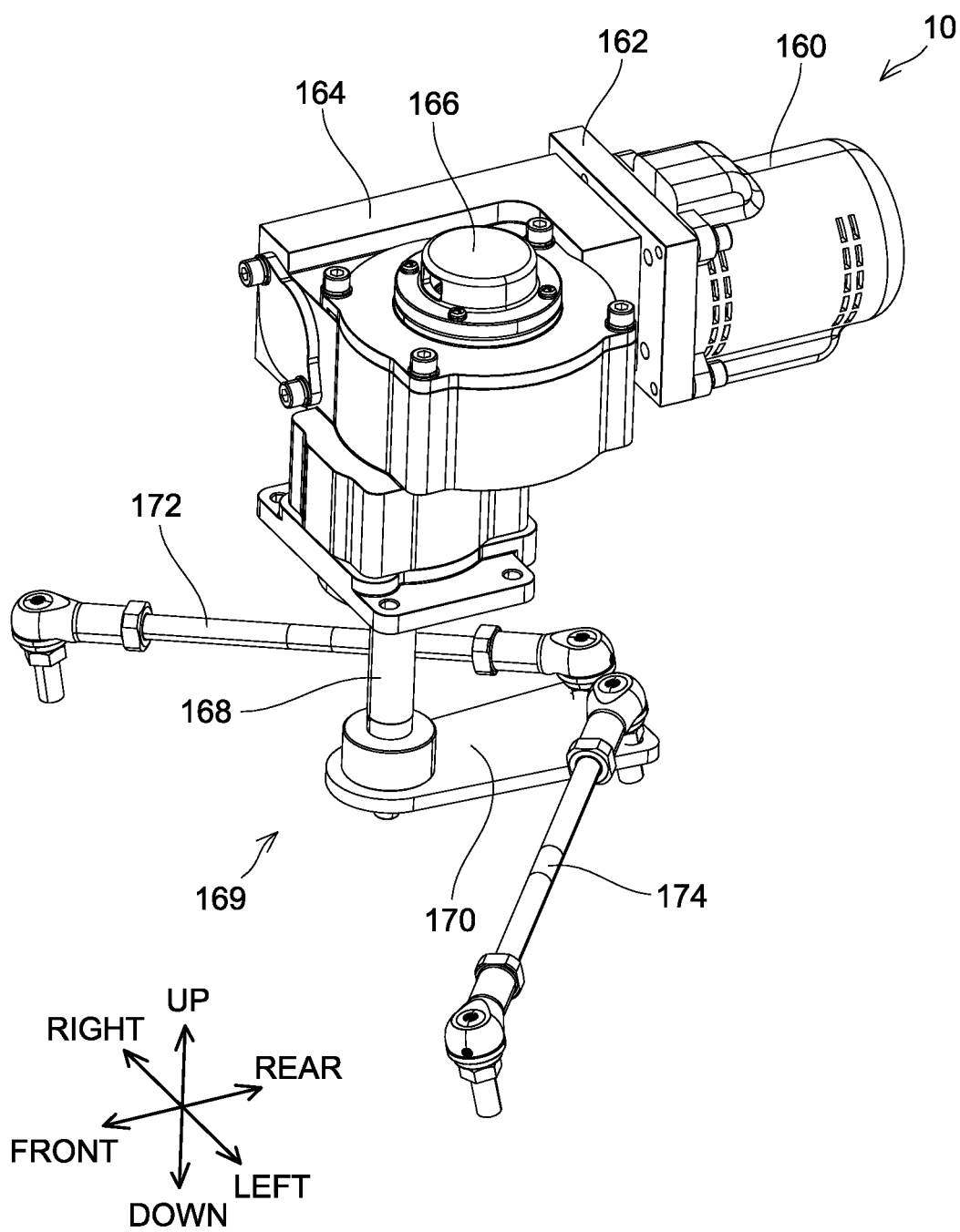
FIG. 21 is a perspective view of the steering unit 10 of the embodiment viewed from the front left upper side.

As shown in FIG. 21, the steering unit 10 includes a motor housing 160, a motor support member 162, a gear housing 164, a steering angle sensor 166, a steering shaft 168, a steering plate 170, a right tie rod 172, and a left tie rod 174. The motor housing 160 is fixed to the motor support, member 162. The motor support member 162 is fixed to the gear housing 164. The gear housing 164 is fixed to the front support member 22 of the carriage unit 4 (see FIG. 20).

Figure 22:
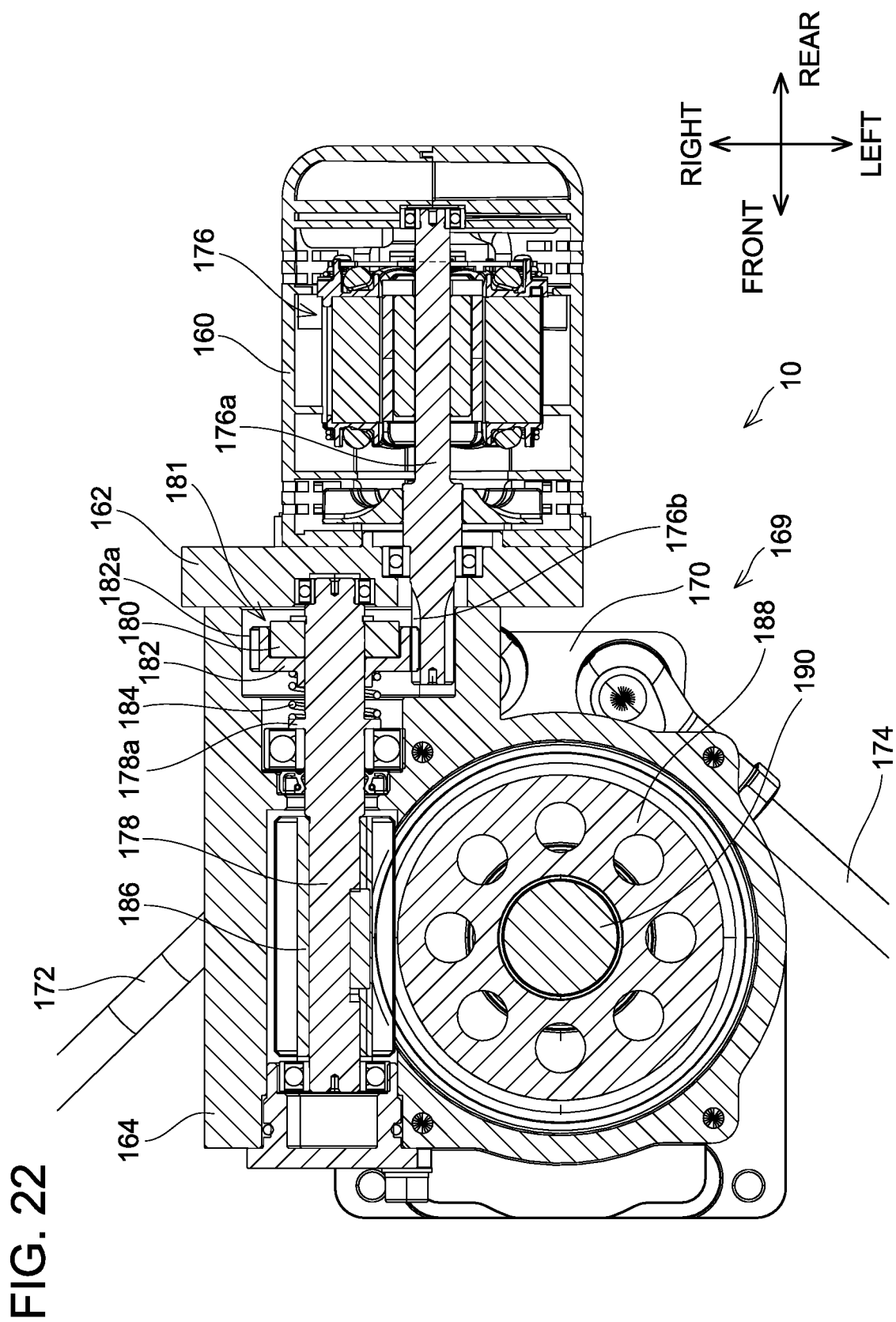
FIG. 22 is a cross-sectional view of the steering unit 10 of the embodiment in a cross section along the front-rear and left-tight directions.

As shown in FIG. 22, the steering motor 176 is housed inside the motor housing 160. The steering motor 176 may for example be an inner rotor brushless DC motor. The steering motor 176 is electrically connected to the drive control circuit board 46 (see FIG. 5). The drive control circuit board 46 is configured to control operation of the steering motor 176. The steering motor 176 includes a motor shaft 176a extending in the front-rear direction. The motor shaft 176a is rotatably held by the motor housing 160 at the vicinity of its rear end and is rotatably held by the motor support member 162 at its front portion. The front portion of the motor shaft 176a penetrates through the motor support member 162 and enters into the gear housing 164. A gear portion 176b is arranged in the vicinity of the front end of the motor shaft 176a.

The gear housing 164 houses a spindle 178, a cam wheel 180, a movable gear 182, a coil spring 184, a cylindrical worm 186, a worm wheel 188, and a relay shaft 190. The spindle 178 is arranged along the front-rear direction. The spindle 178 is rotatably held by the gear housing 164 in the vicinity of its front end and its rear portion. Further, the spindle 178 is rotatably held by the motor support member 162 in the vicinity of its rear end.

Figure 23:
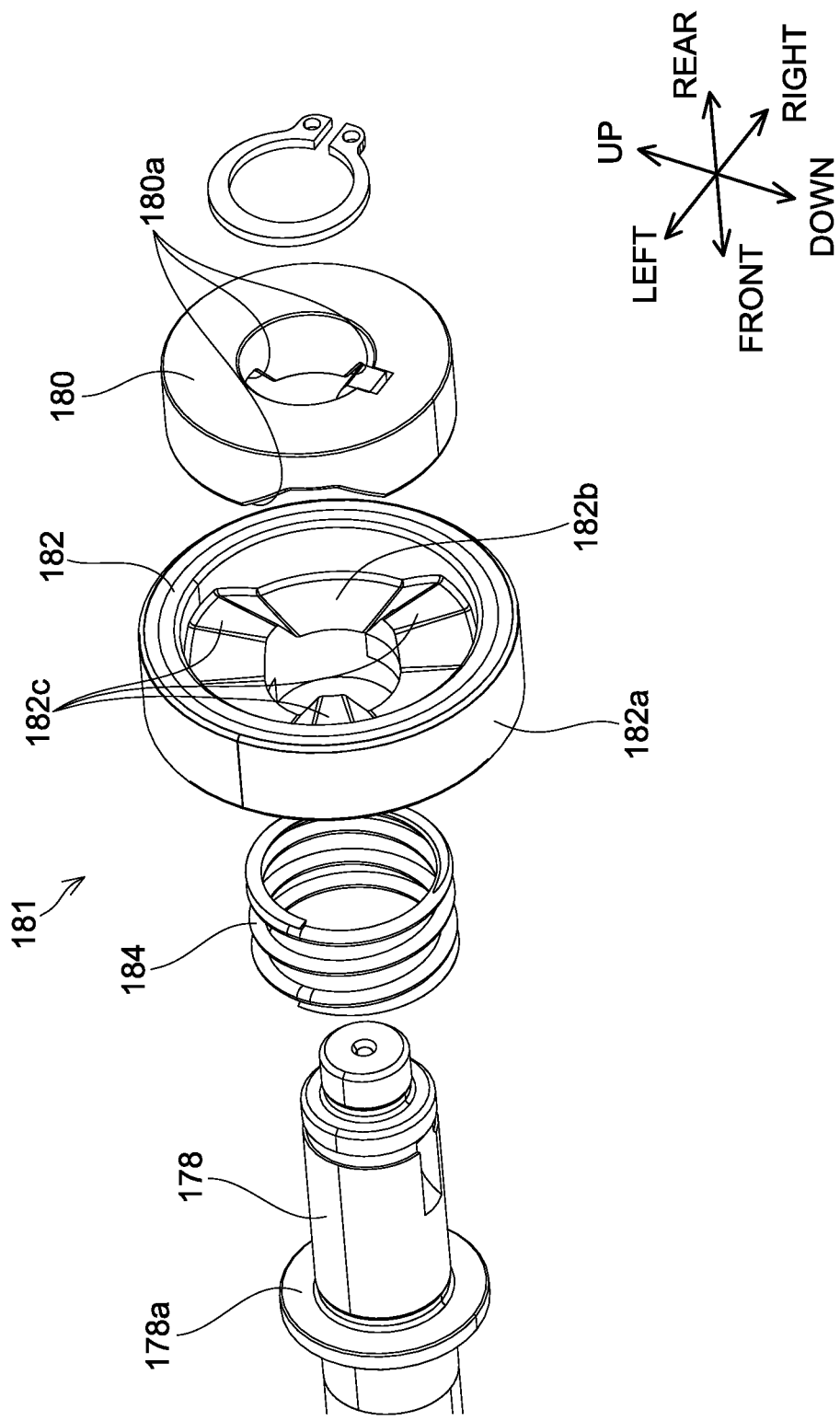
FIG. 23 is a perspective view of a spindle 178, a cam wheel 180, a movable gear 182, and a coil spring 184 of the steering unit 10 of the embodiment viewed from the rear left lower side.

The cam wheel 180 is fixed in the vicinity of the rear end of the spindle 178. As shown in FIG. 23, cam grooves 180a are defined in a front surface of the cam wheel 180. The movable gear 182 is attached to the spindle 178 at a position frontward from the cam wheel 180. The movable gear 182 is held by the spindle 178 such that the movable gear 182 can move in the front-rear direction with respect to the spindle 178 and rotate about the front-rear direction. A gear portion 182a configured to mesh with the gear portion 176b of the motor shaft 176a (see FIG. 22) is arranged on an outer circumferential surface of the movable gear 182. A recess 182b into which the cam wheel 180 is to enter is defined in a rear portion of the movable gear 182. Cam projections 182c corresponding to the cam grooves 180a of the cam wheel 180 fire arranged in the recess 182b. The coil spring 184 is attached to the spindle 178 at a position frontward from the movable gear 182. The coil spring 184 is held by a spring receiving portion 178a arranged on the spindle 178. The coil spring 184 is configured to bias the movable gear 182 rearward relative to the spindle 178.

When the motor shaft 176a (see FIG. 22) rotates, the movable gear 182 also rotates. In the case where the cam projections 182c of the movable gear 182 are engaged with the cam grooves 180a of the cam wheel 180, the cam wheel 180 rotates along with rotation of the movable gear 182, as a result of which the spindle 178 also rotates. When torque acting between the movable gear 182 and the cam wheel 180 is small, engagement of the cam projections 182c and the cam grooves 180a is maintained by a biasing force of the coil spring 184, and transmission of the rotation from the motor shaft 176a to the spindle 178 is maintained. Contrary to this, when the torque acting between the movable gear 182 and the cam wheel 180 is large, the movable gear 182 moves forward against the biasing force of the coil spring 184, by which the engagement of the cam projections 182c and the cam grooves 180a is released, and the transmission of the rotation from the motor shaft 176a to the spindle 178 is thereby blocked. That is, a torque limiter 181 is constituted by the cam wheel 180, the movable gear 182, and the coil spring 184.

Figure 24:
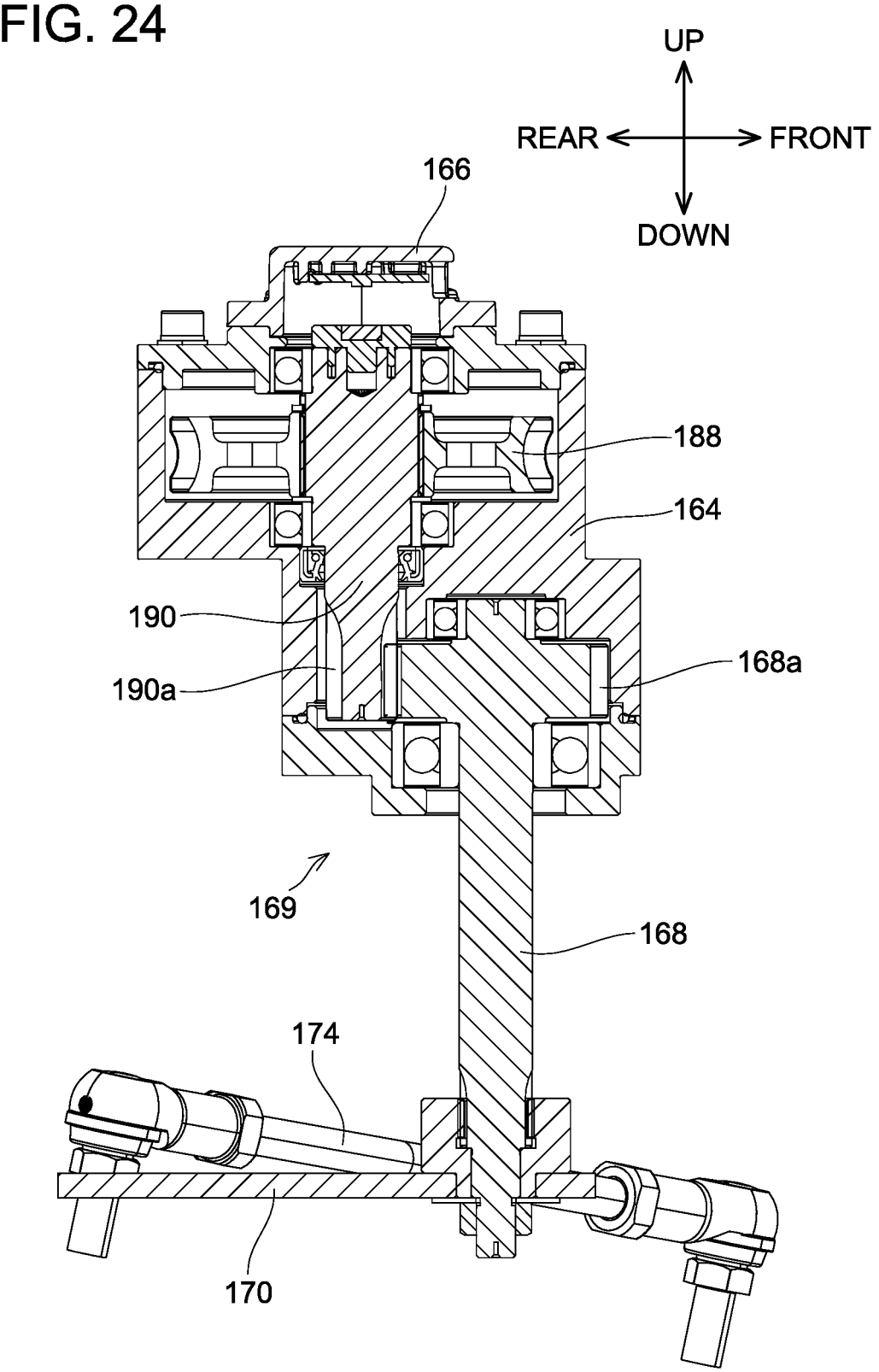
FIG. 24 is a moss-sectional view of the steering unit 10 of the embodiment in a cross section along the front-rear and up-down directions.

As shown in FIG. 22, the cylindrical worm 186 is fixed to a front portion of the spindle 178. The worm wheel 188 is arranged to mesh with the cylindrical worm 186. As shown in FIG. 24, the worm wheel 188 is fixed to an upper portion of the relay shaft 190. The relay shaft 190 is arranged along the up-down direction. The relay shaft 190 is rotatably held by the gear housing 164 at the vicinity of its upper end and at its center portion. A gear portion 190a is arranged in the vicinity of the lower end of the relay shaft 190.

The steering angle sensor 166 is fixed to an upper portion of the gear housing 164. The steering angle sensor 166 is coupled to the upper end of the relay shaft 190. The steering angle sensor 166 is configured to detect a rotation angle of the relay shaft 190 relative to the gear housing 164. The steering angle sensor 166 may for example be a potentiometer configured to detect a change in an electric resistance that occurs in accordance with a change in the rotation angle. Alternatively, the steering angle sensor 166 may be a magnetic rotary sensor having a Hall element of which position is fixed with respect to the gear housing 164 and a permanent magnet of which position is fixed with respect to the relay shaft 190. The steering angle sensor 166 is electrically connected to the main control circuit board 44 (see FIG. 4).

The steering shaft 168 is rotatably held by the gear housing 164 at the vicinity of its upper end and at its upper portion. The steering shaft 168 is arranged along the up-down direction. A gear portion 168a configured to mesh with the gear portion 190a of the relay shaft 190 is arranged at the upper portion of the steering shaft 168. The lower end of the steering shaft 168 is fixed to the vicinity of the front end of the steering plate 170. As shown in FIG. 21, the steering plate 170 has a narrow flat plate shape having its longitudinal direction along the front-rear direction and its short direction along the left-right direction. The rear end of the right tie rod 172 and the rear end of the left tie rod 174 are coupled to the vicinity of the rear end of the steering plate 170. The rear end of the right tie rod 172 is coupled to the steering plate 170 such that the right tie rod 172 is pivotable about two axes orthogonal to the longitudinal direction of the right tie rod 172. The rear end of the left tie rod 174 is coupled to the steering plate 170 such that the left tie rod 174 is pivotable about two axes orthogonal to the longitudinal direction of the left tie rod 174.

As shown in FIG. 22, when the spindle 178 rotates by the rotation of the motor shaft 176a, the rotation of the spindle 178 is transmitted to the relay shaft 190 through the cylindrical worm 186 and the worm wheel 188. As shown in FIG. 24, when the relay shaft 190 pivots, the steering shaft 168 pivots accordingly, and the rear end of the steering plate 170 pivots in the left-right direction. Due to the steering plate 170 pivoting as above, the right tie rod 172 and the left the rod 174 as shown in FIG. 21 move, and steering of the front wheel unit 12 is thereby performed. In the following description, the steering shaft 168, the steering plate 170, the rigid tie rod 172, the left tie rod 174, the spindle 178, the torque limiter 181, the cylindrical worm 186, the worm wheel 188, and the relay shaft 190 may collectively be termed a transmission mechanism 169.

In the manual mode, the main control circuit board 44 (see FIG. 4) calculates a steering angle that should be realized in the steering unit 10 based on a detection signal from the rotation angle sensor 88, 132 of the handle unit 8, 108 (see FIGS. 6 and 13). Then, the main control circuit board 44 calculates a rotation angle that should be realized in the steering motor 176 based on the steering angle that should be realized in the steering unit 10, and instructs the drive control circuit board 48 to actuate the steering motor 176. Due to this, the steering angle responsive to the user operation on the handle unit 8, 108 is realized in the steering unit 10.

(Front Wheel Unit 12)

As shown in FIG. 20, the front wheel unit 12 is attached to the front support member 22 at a front lower portion of the base plate 20 of the carriage unit 4 (see FIG. 2). The front wheel unit 12 includes a right front wheel unit 12a and a left front wheel unit 12b. The right front wheel unit 12a includes a right front wheel 192, a right gear housing 194, a right motor housing 196, a right kingpin 198, a right sleeve 200, a right upper arm 202, a right lower arm 204, a right buffer member 206, a right steering plate 208, and a right actual steering angle sensor 210. The left front wheel unit 12b includes a left front wheel 212, a left gear housing 214, a left motor housing 216, a left kingpin 218 (see FIG. 27), a left sleeve 220, a left upper arm 222, a left lower arm 224, a left buffer member 226, a left steering plate 228, and a left actual steering angle sensor 230. In the following description, the right gear housing 194, the right kingpin 198, the right sleeve 200, and the right steering plate 208 may collectively be termed a right holding member 195, and the left gear housing 214, the left kingpin 218, the left sleeve 220, and the left steering plate 228 may collectively be termed a left holding member 215. Further, the right holding member 195, the right, upper arm 202, the right lower arm 204, the right buffer member 206, the left holding member 215, the left upper arm 222, the left lower arm 224, the left buffer member 226, and the steering unit 10 may collectively be termed a suspension mechanism 11.

Figure 25:
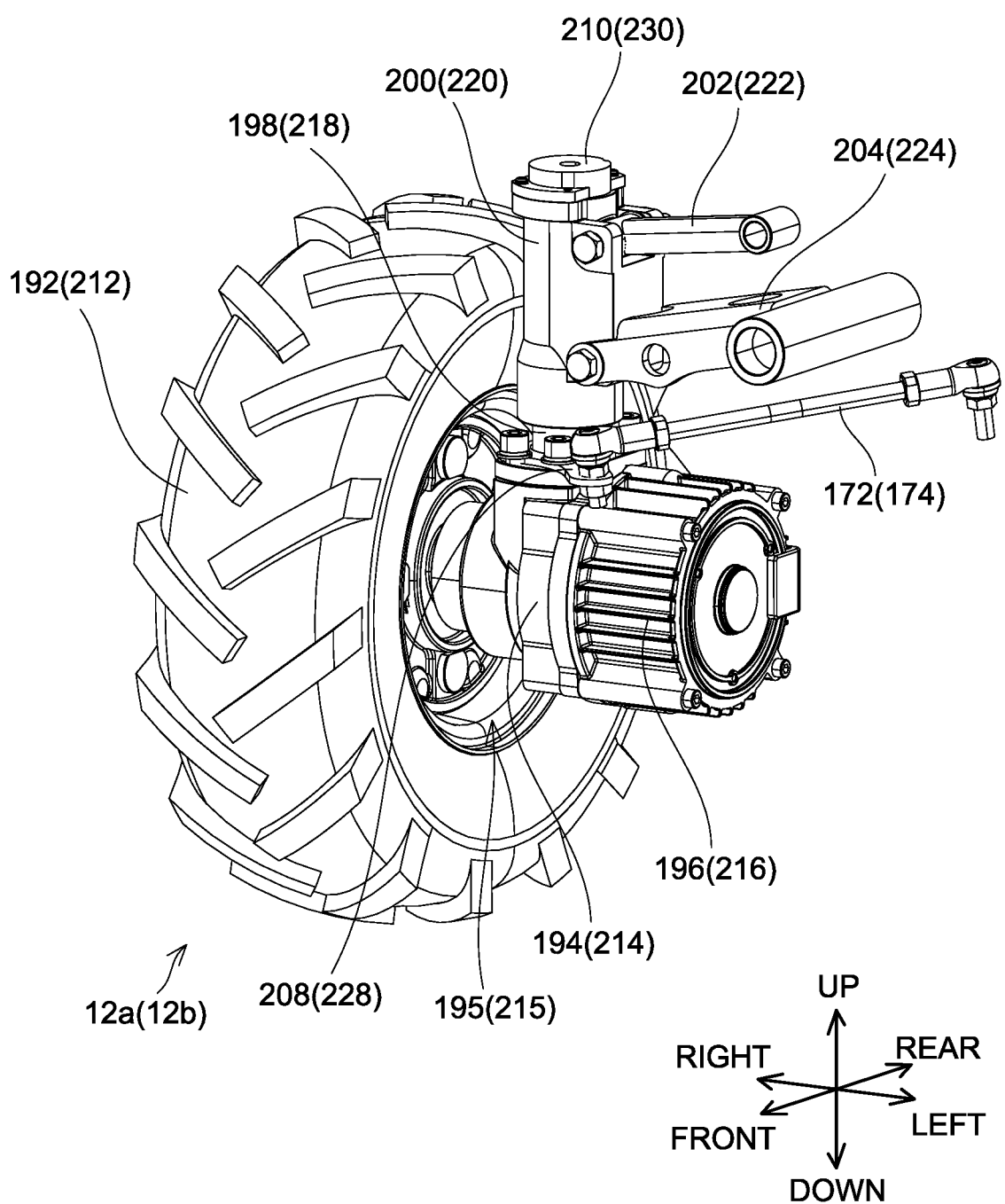
FIG. 25 is a perspective view of a right front wheel unit 12a of the embodiment viewed from the front led upper side.
Figure 26:
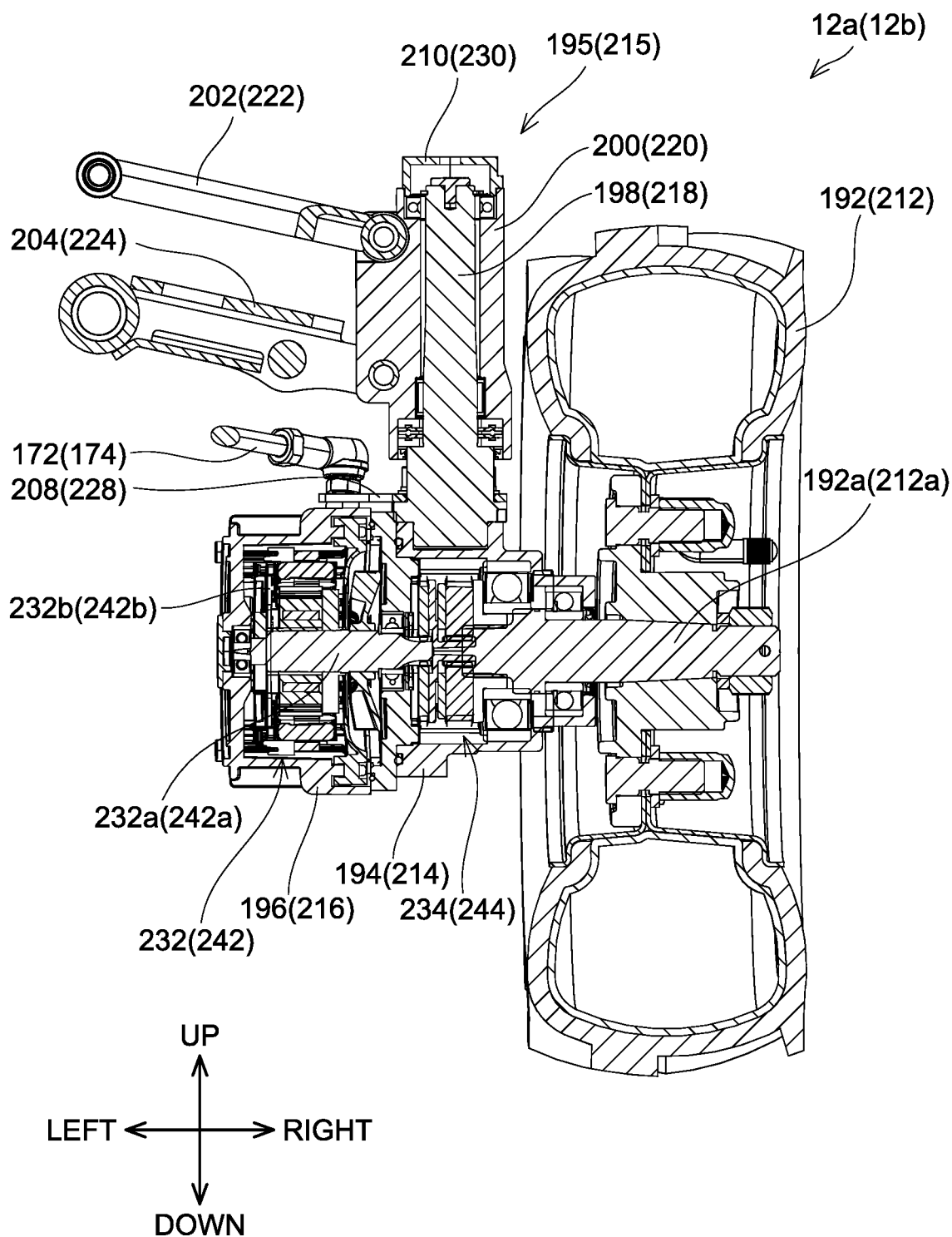
FIG. 26 is a cross-sectional view of the right front wheel unit 12a of the embodiment in a cross section along the left-right and up-down directions.

As shown in FIG. 25, the right gear housing 194 is arranged on the left side of the right front wheel 192. The right motor housing 196 is fixed to a left portion of the right gear housing 194. As shown in FIG. 26, a right front wheel motor 232 is housed inside the right motor housing 196. The right, front wheel motor 232 may for example be an inner rotor brushless DC motor. The right front wheel motor 232 is electrically connected to the drive control circuit board 46 (see FIG. 5). The drive control circuit board 46 is configured to control operation of the right front wheel motor 232. The right front wheel motor 232 includes a right front wheel motor shaft 232a extending in the left-right direction and a right front wheel motor rotary speed sensor 232b configured to detect a rotary speed of the right front wheel motor shaft 232a. The right front wheel motor shaft 232a is rotatably held by the right motor housing 196 at the vicinity of its left end, and is rotatably held by the right gear housing 194 at the vicinity of its right end. The right front wheel 192 includes a right front wheel axle 192a extending leftward. The right front wheel axle 192a is rotatably held by the right gear housing 194 at the vicinity of its left end. A planetary gear mechanism 234 is housed inside the right gear housing 194. The planetary gear mechanism 234 is configured to decelerate the rotation of the right front wheel motor shaft 232a and transmit the same to the right front wheel axle 192a. When the right front wheel motor 232 is actuated, the rotation of the right front wheel motor shaft 232a is transmitted to the right front wheel axle 192a through the planetary gear mechanism 234, as a result of which the right front wheel 192 rotates.

The right kingpin 198 is fixed to an upper portion of the right gear housing 194. The right kingpin 198 extends along the up-down direction. An upper portion of the right kingpin 198 enters inside the right sleeve 200. The right kingpin 198 is rotatably held by the right sleeve 200 in the vicinities of the upper and lower ends of the right sleeve 200. As shown in FIG. 25, the right end of the right upper arm 202 is coupled to an upper portion of the right sleeve 200 such that the right upper arm 202 is pivotable about a pivot axis along the front-rear direction. The right end of the right lower arm 204 is coupled to a lower portion of the right sleeve 200 such that the right lower arm 204 is pivotable about a pivot axis along the front-rear direction. As shown in FIG. 20, the left end of the right upper arm 202 is coupled to a right upper coupling portion 22a of the front support member 22 such that the right upper arm 202 is pivotable about a pivot axis along the front-rear direction. The left end of the right lower arm 204 is coupled to a right lower coupling portion 22b of the front support member 22 such that the right lower arm 204 is pivotable about a pivot axis along the front-rear direction. Due to this, the right sleeve 200 is supported by the front support member 22 such that the right sleeve 200 is movable within a movable range of the right upper arm 202 and the right lower arm 204.

The right buffer member 206 includes a damper 206a and a coil spring 206b. The upper end of the right buffer member 206 is coupled to a front surface of the front support member 22 such that the right buffer member 206 is pivotable about a pivot axis along the front-rear direction. The lower end of the right buffer member 206 is coupled to a front surface of the right lower arm 204 such that the right buffer member 206 is pivotable about a pivot axis along the front-rear direction. Due to this, when the right front wheel 192 moves in the up-down direction relative to the front support member 22, impacts and vibration from the right front wheel 192 are suppressed from being transmitted to the carriage unit 4 by a damping force of the damper 206a and an elastic restoration force of the coil spring 206b.

As shown in FIG. 25, the right steering plate 208 is fixed to the vicinity of the lower end of the right kingpin 198. The front end of the right tie rod 172 is coupled to the left front end of the right steering plate 208 such that the right tie rod 172 is pivotable about two axes orthogonal to the longitudinal direction of the right tie rod 172. When the right front wheel unit 12a is viewed from above, the right tie rod 172 intersects with the right upper arm 202 and the right lower arm 204. When the front wheel unit 12 is steered to the right (or left), the rear end of the steering plate 170 (see FIG. 21) moves rightward (or leftward), by which the right steering plate 208, the right kingpin 198, the right gear housing 194, the light motor housing 196, and the right front wheel 192 pivot clockwise (or counterclockwise) relative to the right sleeve 200 with an axial direction of the right kingpin 198 as their pivoting axes in a top view viewing the right sleeve 200 from above.

The rigid actual steering angle sensor 210 is fixed to the upper portion of the right sleeve 200. The right actual steering angle sensor 210 is coupled to the upper end of the right kingpin 198. The right actual steering angle sensor 210 is configured to detect a rotation angle of the right kingpin 198 with respect to the right sleeve 200. The right actual steering angle sensor 210 may for example be a potentiometer configured to detect a change in an electric resistance that occurs in accordance with a change in the rotation angle. Alternatively, the right actual steering angle sensor 210 may be a magnetic rotary sensor having a Hall element of which position is fixed with respect to the right sleeve 200 and a permanent magnet of which position is fixed with respect to the right kingpin 198. The right actual steering angle sensor 210 is electrically connected to the main control circuit board 44 (see FIG. 4).

As shown in FIG. 20, the left front wheel unit 12b has a configuration that is in a left-right symmetric relationship with the right front wheel unit 12a. Hereinbelow, the left front wheel unit 12b will be described with reference to FIGS. 25 and 26 showing the right front wheel unit 12a.

As shown in FIG. 25, the left gear housing 214 is arranged on the right of the left front wheel 212. The left motor housing 216 is fixed to a right portion of the left gear housing 214. As shown in FIG. 26, a left front wheel motor 242 is housed inside the left motor housing 216. The left front wheel motor 242 may for example be an inner rotor brushless DC motor. The left front wheel motor 242 is electrically connected to the drive control circuit board 48 (see FIG. 5). The drive control circuit board 48 is configured to control operation of the left front wheel motor 242. The left front wheel motor 242 includes a left front, wheel motor shaft 242a extending in the left-right direction and a left front wheel motor rotary speed sensor 242b configured to detect a rotary speed of the left front wheel motor shaft 242a. The left front wheel motor shaft 242a is rotatably held by the left motor housing 216 at the vicinity of its right end, and is rotatably held by the left gear housing 214 at the vicinity of its left end. The left front wheel 212 includes a left axle 212a extending rightward. The left axle 212a is rotatably held by the left gear housing 214 at the vicinity of its right end. A planetary gear mechanism 244 is housed inside the left gear housing 214. The planetary gear mechanism 244 is configured to decelerate the rotation of the left front wheel motor shaft 242a and transmit the same to the left axle 212a. When the left front wheel motor 242 is actuated, the rotation of the left front wheel motor shaft 242a is transmitted to the left axle 212a through the planetary gear mechanism 244, as a result of which the left front wheel 212 rotates.

The left kingpin 218 is fixed to an upper portion of the left gear housing 214. The left kingpin 218 extends along the up-down direction. An upper portion of the left kingpin 218 enters inside the left sleeve 220. The left kingpin 218 is rotatably held by the left sleeve 220 in the vicinities of upper and lower ends of the left sleeve 220. As shown in FIG. 25, the left end of the left upper arm 222 is coupled to an upper portion of the left sleeve 220 such that the left upper arm 222 is pivotable about a pivot axis along the front-rear direction. The left end of the left lower arm 224 is coupled to a lower portion of the left sleeve 220 such that the left lower arm 224 is pivotable about a pivot axis along the front-rear direction. As shown in FIG. 20, the right end of the left upper arm 222 is coupled to a left upper coupling portion 22c of the front support member 22 such that the left upper arm 222 is pivotable about a pivot axis along the front-rear direction. The right end of the left lower arm 224 is coupled to a left lower coupling portion 22d of the front support member 22 such that the left lower arm 224 is pivotable about a pivot axis along the front-rear direction. Due to this, the left sleeve 220 is supported by the front support member 22 such that the left sleeve 220 is movable within a movable range of the left, upper arm 222 and the left lower arm 224.

The left buffer member 226 includes a damper 226a and a coil spring 226b. The upper end of the left buffer member 226 is coupled to the front surface of the front support member 22 such that the left buffer member 226 is pivotable about a pivot axis along the front-rear direction. The lower end of the left buffer member 226 is coupled to the front surface of the left lower arm 224 such that the left buffer member 226 is pivotable about a pivot axis along the front-rear direction. Due to this, when the left front wheel 212 moves in the up-down direction with respect to the front support member 22, impacts and vibration from the left front wheel 212 are suppressed from being transmitted to the carriage unit 4 by a damping force of the damper 226a and an elastic restoration force of the coil spring 226b.

As shown in FIG. 25, the left steering plate 228 is fixed to the vicinity of the lower end of the left kingpin 218. The front end of the left tie rod 174 is coupled to the right front end of the left steering plate 228 such that the left tie rod 174 is pivotable about two axes orthogonal to the longitudinal direction of the left tie rod 174. When the left front wheel unit 12b is viewed from above, the left, tie rod 174 intersects the left upper arm 222 and the left lower arm 224. When the front wheel unit 12 is steered to the right (or left), the rear end of the steering plate 170 (see FIG. 21) moves rightward tor leftward), by which the left steering plate 228, the left kingpin 218, the left gear housing 214, the left motor housing 216, and the left front wheel 212 pivot clock wise (or counterclockwise) relative to the left sleeve 220 with an axial direction of the left kingpin 218 as their pivoting axes in a top view viewing the left sleeve 220 from above.

The left actual steering angle sensor 230 is fixed to the upper portion of the left sleeve 220. The left actual steering angle sensor 230 is coupled to the upper end of the left kingpin 218. The left actual steering angle sensor 230 is configured to detect a rotation angle of the left kingpin 218 with respect to the left sleeve 220. The left actual steering angle sensor 230 may for example be a potentiometer configured to detect a change in an electric resistance that occurs in accordance with a change in the rotation angle. Alternatively, the left actual steering angle sensor 230 may be a magnetic rotary sensor having a Hall element of which position is fixed with respect to the left sleeve 220 and a permanent magnet of which position is fixed with respect to the left kingpin 218. The left actual steering angle sensor 230 is electrically connected to the main control circuit board 44 (see FIG. 4).

Figure 27:
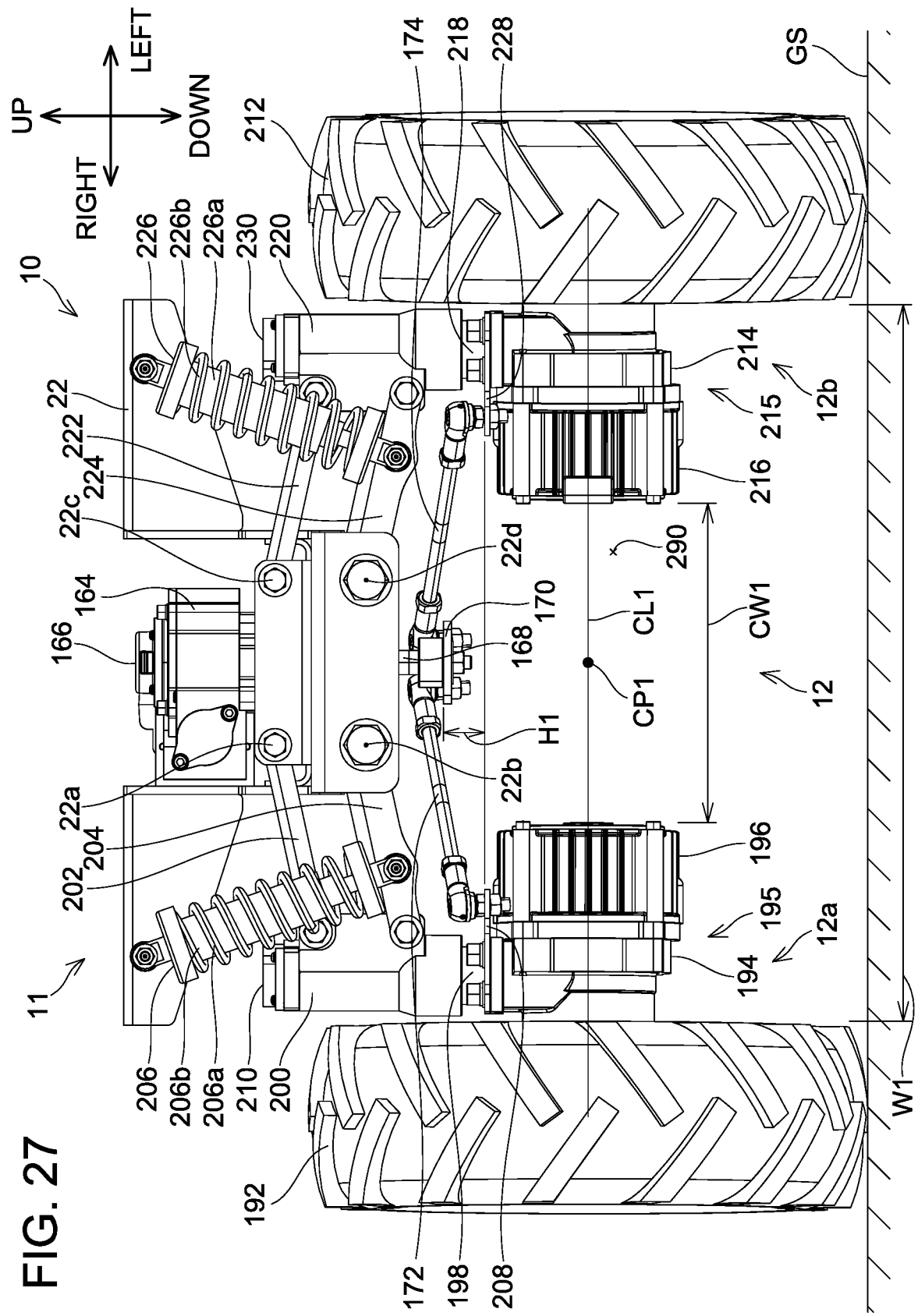
FIG. 27 is a front view of the steering unit 10 and a front wheel unit 12 of the embodiment in a non-sinking state.
Figure 28:
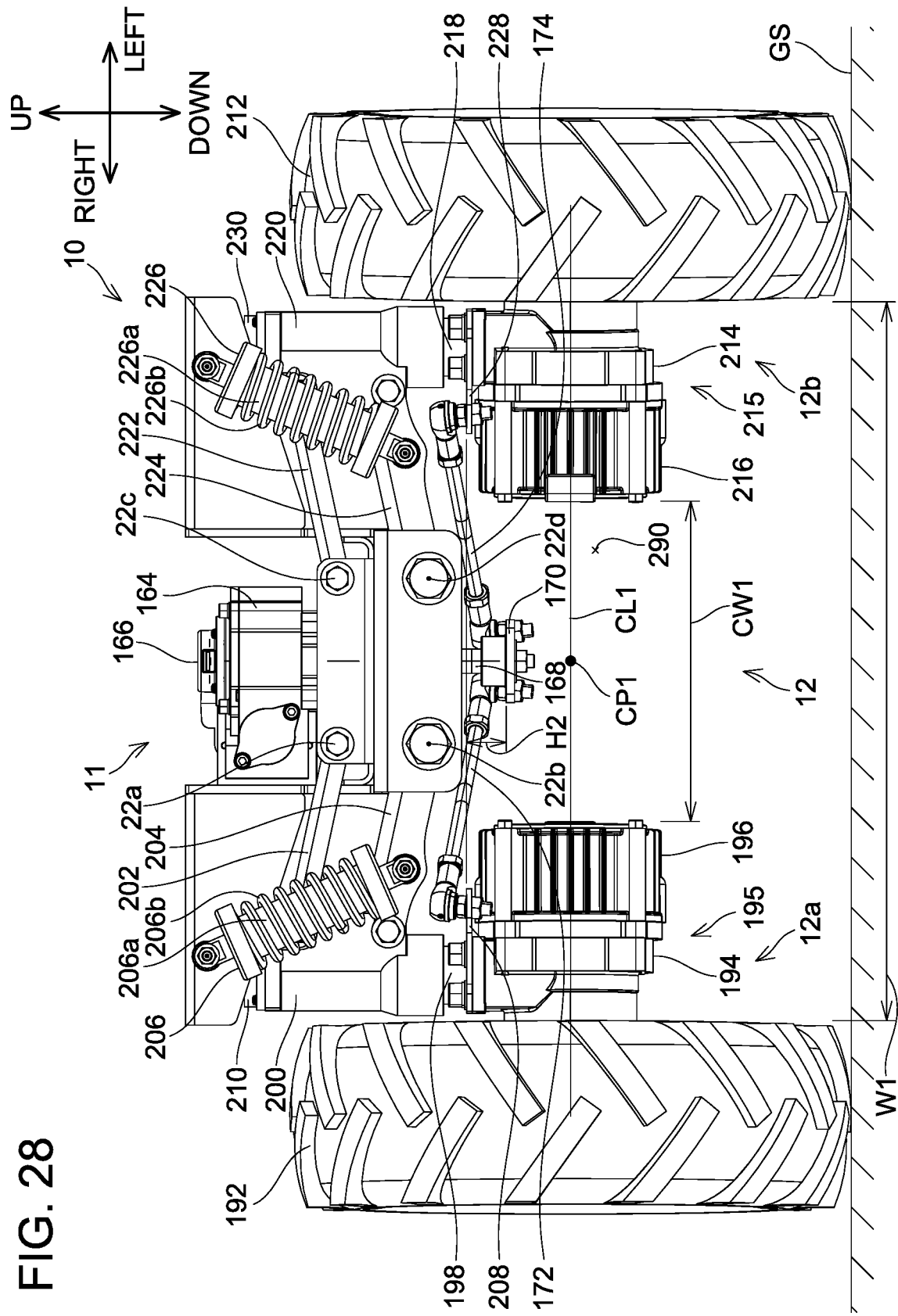
FIG. 28 is a front view of the steering unit 10 and the front wheel unit 12 of the embodiment in a maximum sinking state.
Figure 29:
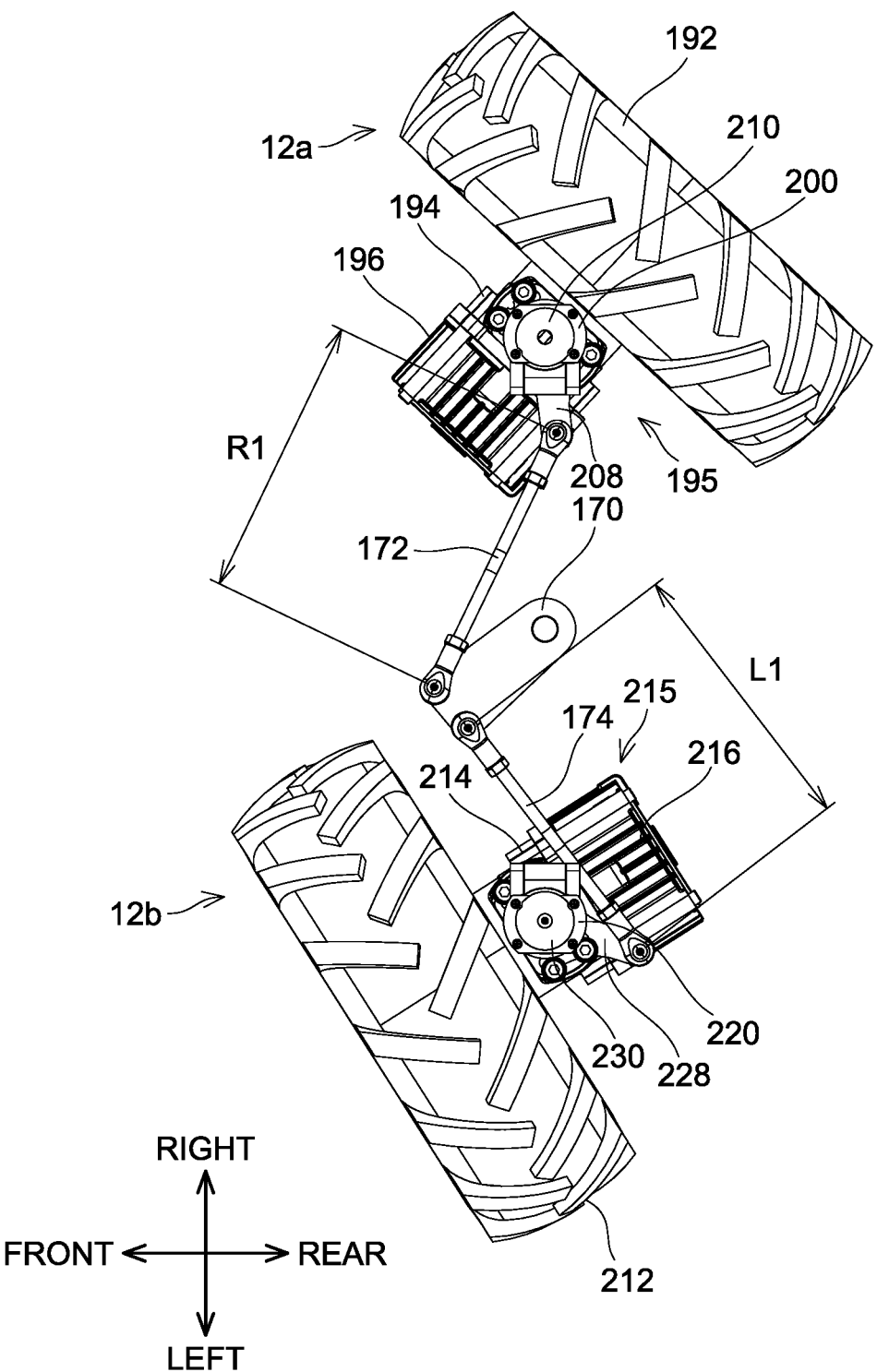
FIG. 29 is a top view of a steering plate 170, a right tie rod 172, a left tie rod 174, the right front wheel unit 12a, and a left front wheel unit 12b in the steering unit 10 and the front wheel unit 12 of the embodiment in a case of steering to the right in the non-sinking state.
Figure 30:
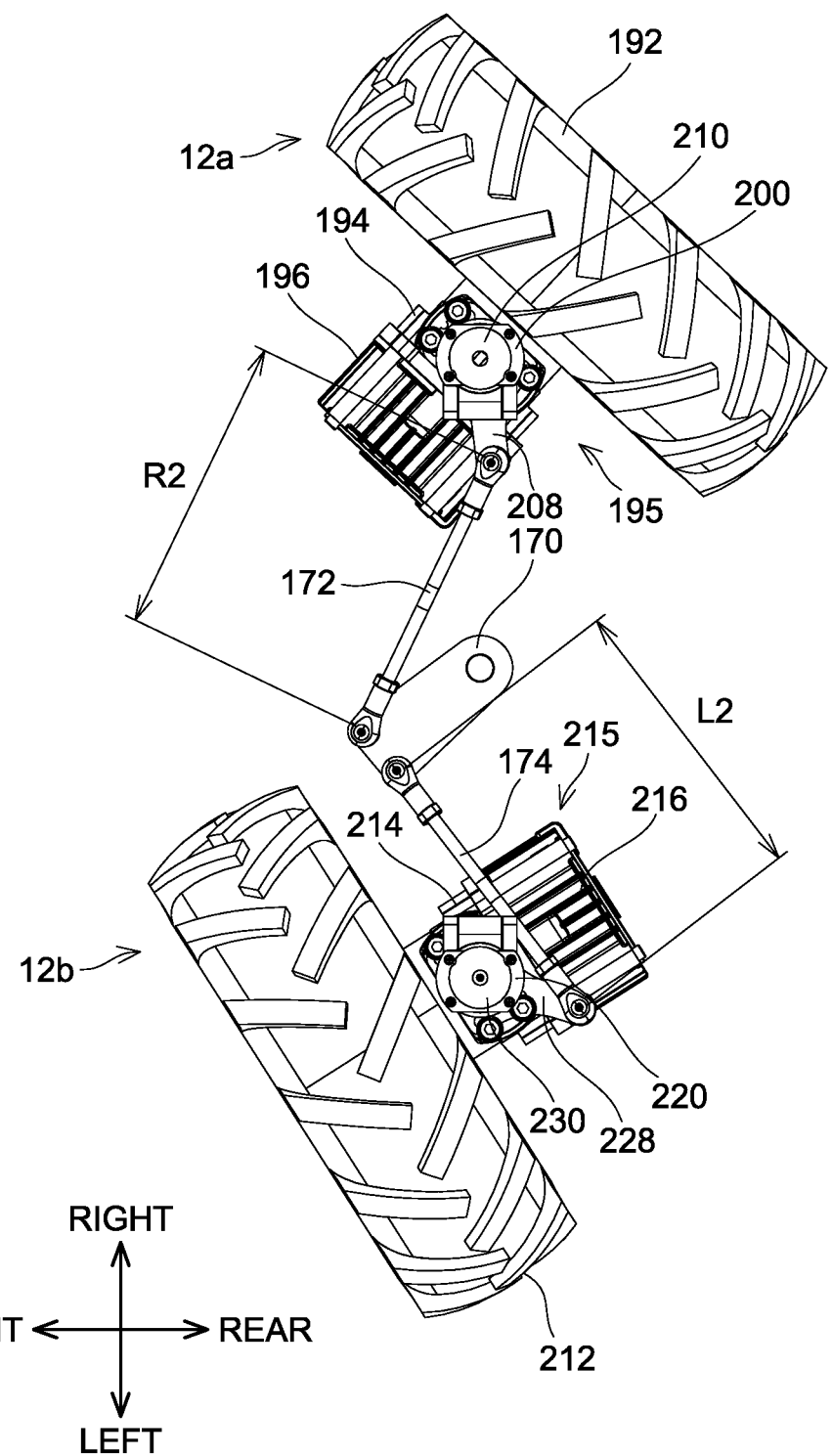
FIG. 30 is a top view of the steering plate 170, the right tie rod 172, the left tie rod 174, the right front wheel unit 12a, and the left front wheel unit 12b in the steering unit 10 and the front wheel unit 12 of the embodiment in a case of steering to the right in the maximum sinking state.

As shown in FIG. 27, in the state in which the carriage unit 4 is not sinking with respect to the right front wheel 102 and the left front wheel 212 (which will hereinbelow be termed a non-sinking slate), the steering plate 170 is positioned higher than the right steering plate 208 and the left steering plate 228 by a first predetermined height H1. Such a non-sinking state is realized for example when no luggage is placed on the luggage carrier unit 6 and the cart 2 is stopped. Contrary to this, as shown in FIG. 28, in the case in which the carriage unit 4 has sunk to its maximum with respect to the right front wheel 192 and the left hunt wheel 212 (which will hereinbelow be termed a maximum-sinking state), the steering plate 170 is positioned lower than the right steering plate 208 and the left, steering plate 228 by a second predetermined height H2. Such a maximum-sinking state is realized for example in the state in which the cart 2 is in use and a maximum load allowed for the right buffer member 206 and the left buffer member 226 is applied to the right buffer member 206 and the left buffer member 226. In the cart 2 of the present embodiment, the first predetermined height H1 and the second predetermined height 112 are substantially equal. In this case, lengths R1, L1 of the right tie rod 172 and the left tie rod 174 projected in a plane perpendicularly intersecting the up-down direction in the non-sinking state as shown in FIG. 29 and lengths R2, L2 of the right tie rod 172 and the left tie rod 174 projected in the plane perpendicularly intersecting the up-down direction as shown in FIG. 30 become substantially equal.

Lengths R, L of the right tie rod 172 and the left tie rod 174 projected in the plane perpendicularly intersecting the up-down direction increase as the carriage unit 4 sink in from the non-sinking state, and reach, their maximum when the steering plate 170 come to the same height as the right steering plate 208 and the left steering plate 228. After this, as the carriage unit 4 further sink in toward the maximum-sinking state, the steering plate 170 sink lower than the right steering plate 208 and the left steering plate 228, and the lengths R, L of the right tie rod 172 and the left tie rod 174 projected in the plane perpendicularly intersecting the up-down direction decrease. In the cart 2 of the present embodiment, since the lengths R1, L1 in the non-sinking stale are substantially the same as the lengths R2, L2 in the maximum-sinking state, a variation range of the lengths R, L of the right tie rod 172 and the left tie rod 174 projected in the plane perpendicularly intersecting the up-down direction can be reduced.

(Rear Wheel Unit 14)

Figure 31:
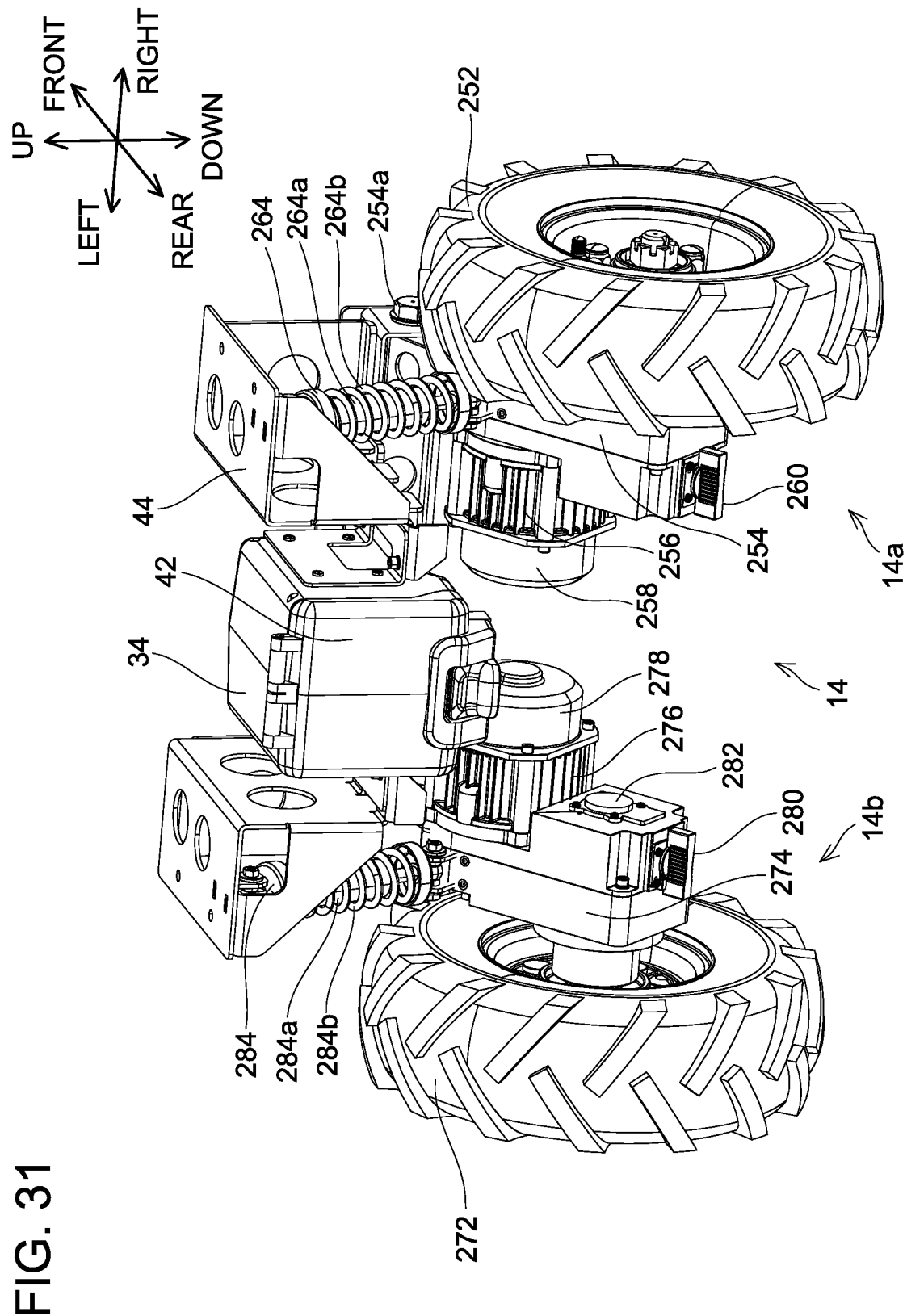
FIG. 31 is a perspective view of a rear wheel unit 14 of the embodiment viewed from the rear right upper side.

As shown in FIG. 31, the rear wheel unit 14 is attached to the rear support member 24 at a rear lower portion of the base plate 20 of the carriage unit 4 (see FIG. 2). The rear wheel unit 14 includes a right rear wheel unit 14a and a left rear wheel unit 14b. The right rear wheel unit 14a includes a right rear wheel 252, a right gear housing 254, a right motor housing 256, a right brake housing 258, a right clutch lever 260, a right rear wheel rotary speed sensor 262 (see FIG. 32), and a right buffer member 264. The left rear wheel unit 14b includes a left rear wheel 272, a left gear housing 274, a left motor housing 276, a left brake housing 278, a left clutch lever 280, a left rear wheel rotary speed sensor 282, and a left buffer member 284.

Figure 32:
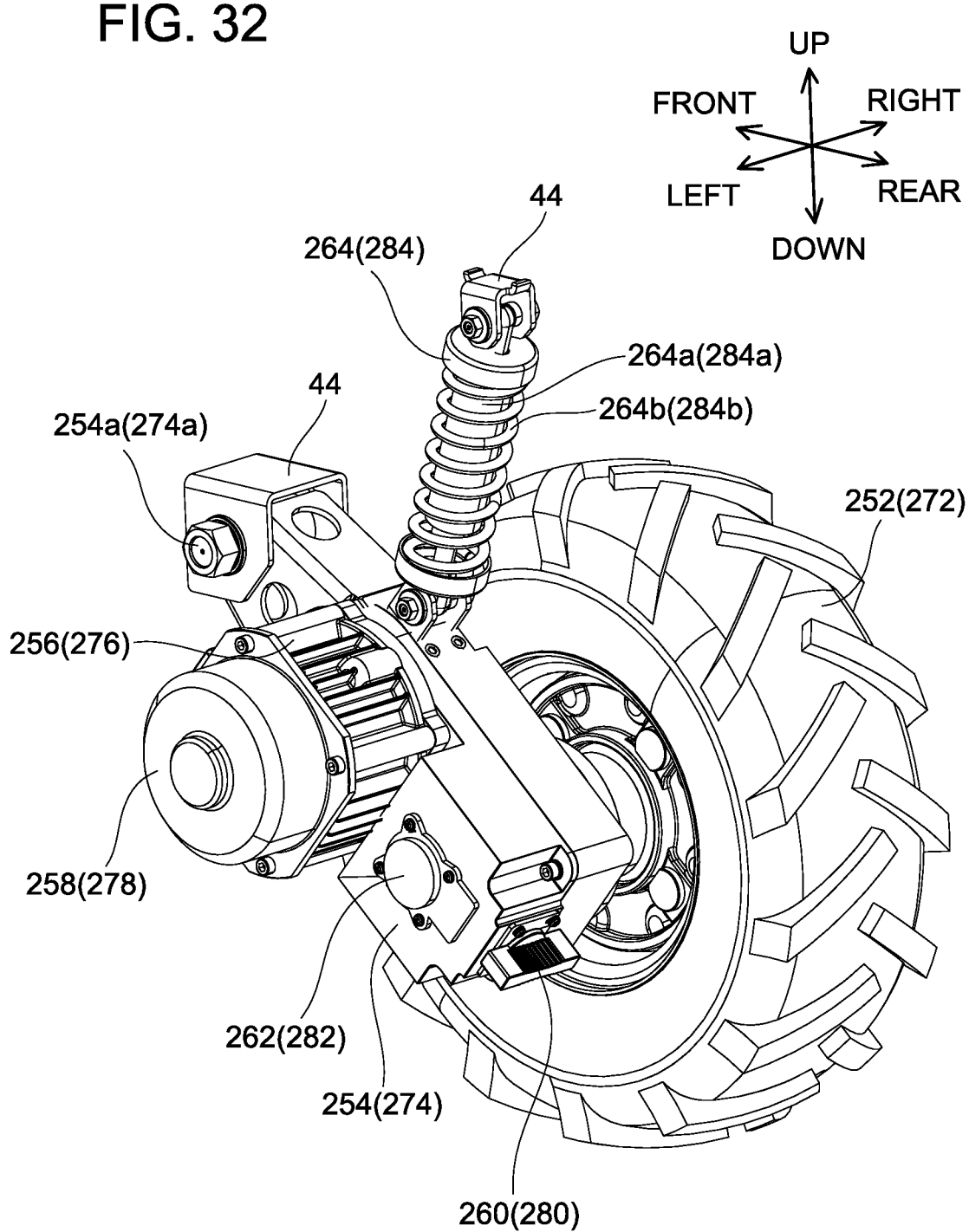
FIG. 32 is a perspective view of a right rear wheel unit 14a of the embodiment viewed from the rear left upper side.

As shown in FIG. 32, the right gear housing 254 is arranged on the left side of the right rear wheel 252 and rotatably holds a right rear wheel axle (not shown) of the right rear wheel 252. The right gear housing 254 extends upward and frontward from the right rear wheel axle. The right motor housing 256 is fixed to a front upper left portion of the right gear housing 254. The right brake housing 258 is fixed to a left portion of the right motor housing 256. A right rear wheel motor (not shown) is housed in the right motor housing 256. The right rear wheel motor may for example be an inner rotor brushless DC motor. The right rear wheel motor is electrically connected to the drive control circuit board 46 (see FIG. 5). The drive control circuit board 46 is configured to control operation of the right rear wheel motor. The right rear wheel motor includes a right rear wheel motor shaft (not shown) extending in the left-right direction and a right rear wheel motor rotary speed sensor (not shown) configured to detect a rotary speed of the right rear wheel motor shaft. A right rear wheel electromagnetic brake (not shown) is housed in the right brake housing 258. The right rear wheel electromagnetic brake is coupled to the right rear wheel motor shaft. The right rear wheel electromagnetic brake is configured to switch between a state allowing rotation of the right rear wheel motor shaft and a state prohibiting the same. The right rear wheel electromagnetic brake is electrically connected to the drive control circuit board 46 (see FIG. 5). The drive control circuit board 46 is configured to control operation of the right rear wheel electromagnetic brake. In the parking mode, the right rear wheel electromagnetic brake is maintained in the state prohibiting rotation of the right roar wheel motor shaft.

A spur gear mechanism (not shown) and a clutch mechanism (not shown) are housed in the right gear housing 254. The spur gear mechanism is configured to decelerate the rotation of the right rear wheel motor shaft and transmit the same to the right rear wheel axle. When the right rear wheel motor is actuated, the rotation of the right rear wheel motor shaft is transmitted to the right rear wheel axle through the spur gear mechanism, and the right rear wheel 252 thereby rotates. The clutch mechanism is configured to switch between a state allowing transmission of the rotation from the right rear wheel motor shaft to the right rear wheel axle and a state prohibiting the same in response to an operation performed on the right clutch lever 260. Due to this, by switching the clutch mechanism to the state prohibiting the transmission of the rotation from the right rear wheel motor shaft to the right rear wheel axle when the right rear wheel electromagnetic brake prohibits the rotation of the right rear wheel motor shaft, the right rear wired 252 can be suppressed from locking. The right mar wheel rotary speed sensor 262 is fixed to the rear lower left portion of the right gear housing 254. The right rear wheel rotary speed sensor 262 is coupled to the left end of the right rear wheel axle. The right rear wheel rotary speed sensor 262 is configured to detect a rotary speed of the right rear wheel axle with respect to the right gear housing 254. The right rear wheel rotary speed sensor 262 is electrically connected to the main control circuit board 44 (see FIG. 4).

A coupling portion 254a is arranged in the vicinity of the front upper end of the right gear housing 254. The coupling portion 254a is coupled to the rear support member 24 such that the coupling portion 254a is pivotable about a pivot axis along the left-right direction. The right buffer member 264 includes a damper 264a and a coil spring 264b. The upper end of the right buffer member 264 is coupled to the rear support member 24 at a portion rearward and upward from the coupling portion 254a such that the right buffer member 264 is pivotable about a pivot axis along the left-right direction. The lower end of the right buffer member 264 is coupled to a rear upper surface of the right gear housing 254 such that the right buffer member 264 is pivotable about a pivot axis along the left-right direction. Due to this, when the right rear wheel 252 moves in the up-down direction relative to the rear support member 24, impacts and vibration from the right rear wheel 252 are suppressed from being transmitted to the carriage unit 4 by a damping force of the damper 264a and an elastic restoration force of the coil spring 264b.

As shown in FIG. 31, the left rear wheel unit 14b includes a configuration that is in a left-right symmetric relationship with the right rear wheel unit 14a. Hereinbelow, the left rear wheel unit 14b will be described with reference to FIG. 32 showing the right rear wheel unit 14a.

As shown in FIG. 32, the left gear housing 274 is arranged on the right side of the left rear wheel 272 and rotatably holds a left rear wheel axle (not shown) of the left rear wheel 272. The left gear housing 274 extends upward and frontward from the left rear wheel axle. The left motor housing 276 is fixed to a front upper right portion of the left gear housing 274. The left brake housing 278 is fixed to a right portion of the left motor housing 276. A left rear wheel motor (not shown) is housed in the left motor housing 276. The left rear wheel motor may for example be an inner rotor brushless DC motor. The left rear wheel motor is electrically connected to the drive control circuit board 48 (see FIG. 5). The drive control circuit board 48 is configured to control operation of the left rear wheel motor. The left rear wheel motor includes a left rear wheel motor shaft (not shown) extending in the left-right direction and a left rear wheel motor rotary speed sensor (not shown) configured to detect a rotary speed of the left rear wheel motor shaft. A left rear wheel electromagnetic brake (nor shown) is housed in the left brake housing 278. The left rear wheel electromagnetic brake is coupled to the left rear wheel motor shaft. The left rear wheel electromagnetic brake is configured to switch between a state allowing rotation of the left rear wheel motor shaft and a state prohibiting the same. The left rear wheel electromagnetic brake is electrically connected to the drive control circuit board 48 (see FIG. 5). The drive control circuit board 48 is configured to control operations of the left rear wheel electromagnetic brake. In the parking mode, the left rear wheel electromagnetic brake is maintained in the state prohibiting rotation of the left rear wheel motor shaft.

A spur gear mechanism (not shown) and a clutch mechanism (not shown) are housed in the left gear housing 274. The spur gear mechanism is configured to decelerate the rotation of the left rear wheel motor shaft and transmits the same to the left rear wheel axle. When the left rear wheel motor is actuated, the rotation of the left rear wheel motor shaft is transmitted to the left rear wheel axle through the spur gear mechanism, and the left rear wheel 272 thereby rotates. The clutch mechanism is configured to switch between a state allowing transmission of the rotation from the left rear wheel motor shaft to the left rear wheel axle and a state prohibiting the same in response to an operation performed on the left clutch lever 280. Due to this, by switching the clutch mechanism to the state prohibiting the transmission of the rotation from the left rear wheel motor shaft to the left rear wheel axle when the left rear wheel electromagnetic brake prohibits the rotation of the left rear wheel motor shaft, the left rear wheel 272 can be suppressed from locking. The left rear wheel rotary speed sensor 282 is fixed to a rear lower right portion of the left gear housing 274. The left rear wheel rotary speed sensor 282 is coupled to the right end of the left rear wheel axle. The left rear wheel rotary speed sensor 282 is configured to detect a rotary speed of the left rear wheel axle with respect to the left gear housing 274. The left rear wheel rotary speed sensor 282 is electrically connected to the main control circuit board 44 (see FIG. 4).

A coupling portion 274a is arranged in the vicinity of the front upper end of the left gear housing 274. The coupling portion 274a is coupled to the rear support member 24 such that the coupling portion 274a is pivotable about a pivot axis along the left-right direction. The left buffer member 284 includes a damper 284a and a coil spring 284b. The upper end of the left buffer member 284 is coupled to the rear support member 24 at a portion rearward and upward from the coupling portion 274a such that the left buffer member 284 is pivotable about a pivot axis along the left-right direction. The lower end of the left buffer member 284 is coupled to a rear upper surface of the left gear housing 274 so that the left buffer member 284 is pivotable about a pivot axis along the left-right direction. Due to this, when the left rear wheel 272 moves in the up-down direction relative to the rear support member 24, impacts and vibration from the left rear wheel 272 are suppressed from being transmitted to the carriage unit 4 by a damping force of the damper 284a and an elastic restoration force of the coil spring 284b.

The main control circuit board 44 (see FIG. 4) is configured to calculate an actual travelling route of the cart 2 based on a steering angle obtained from a detection signal of the steering angle sensor 166 of the steering unit 10, rotary speeds of the right front wheel motor 232 and the left front wheel motor 242 obtained from detection signals from the right front wheel motor rotary speed sensor 232b and the left front wheel motor rotary speed sensor 242b of the front wheel unit 12, and rotary speeds of the right rear wheel motor and the left rear wheel motor obtained from detection signals from the right rear wheel motor rotary speed sensor and the left rear wheel motor rotary speed sensor of the rear wheel unit 14.

Figure 33:
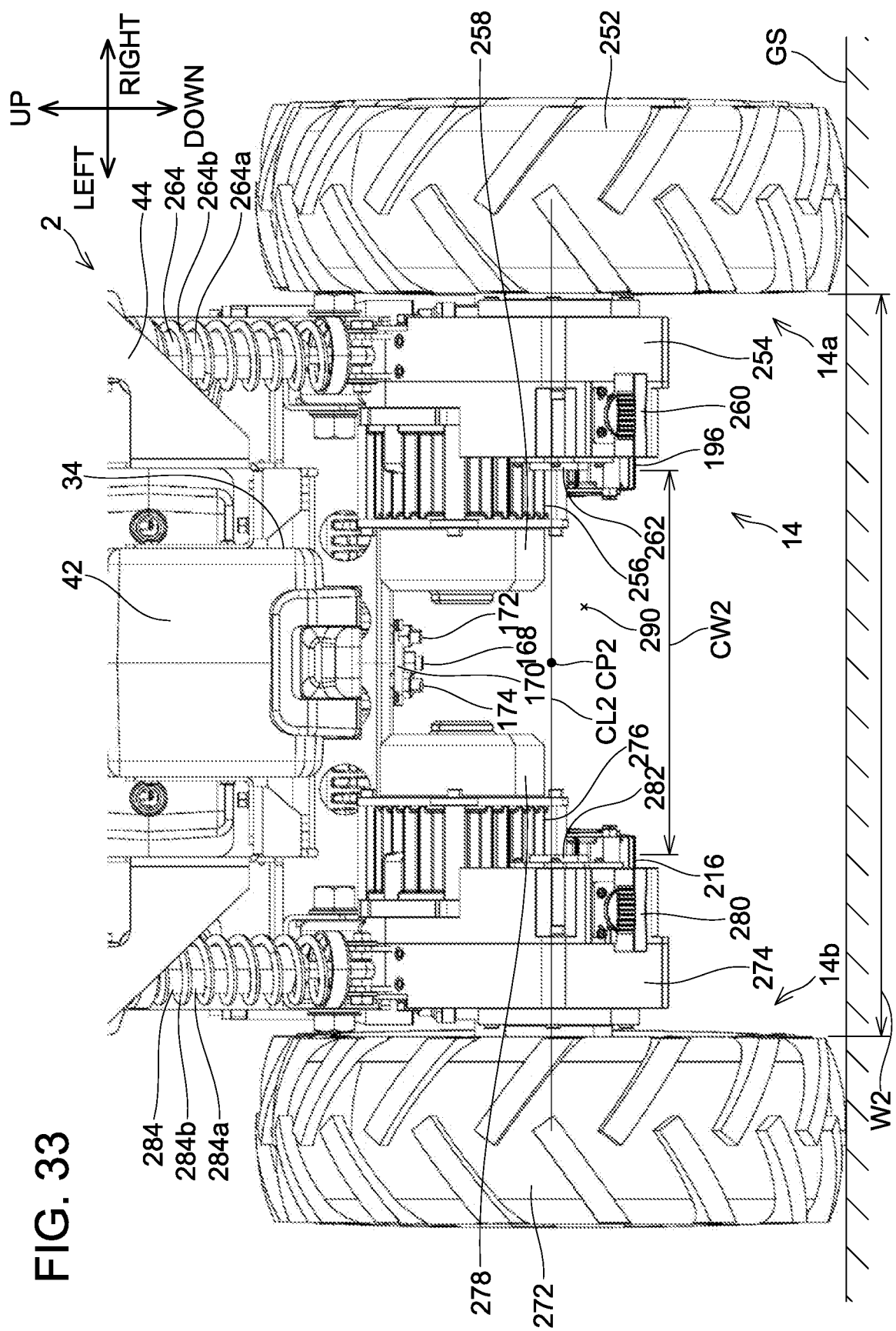
FIG. 33 is a tear view of a lower portion of the cart 2 of the embodiment.

As shown in FIG. 33, a lower space 290 extending upward from the ground GS is defined at the center below the carriage unit 4 as the cart 2 is viewed from behind. As shown in FIGS. 27 and 28, the lower space 290 includes a midpoint CP1 of a straight line CL1 connecting the center of the right front wheel 192 and the center of the left front wheel 212. The lower space 290 has a width CW1 between the right front wheel 192 and the left front wheel 212. The width CW1 is ⅓ or more of a distance W1 between a left side surface of the right front wheel 192 and a right side surface of the left front wheel 212. Further, as shown in FIG. 33, the lower space 290 includes a midpoint CP2 of a straight line CL2 connecting the center of the right rear wheel 252 and the center of the left rear wheel 272. The lower space 290 has a width CW2 between the right real wheel 252 and the left rear wheel 272. The width CW2 is ⅓ or more of a distance W2 between a left side surface of the right rear wheel 252 and a right side surface of the left rear wheel 272. By configuring as such, even when an obstacle is on the ground GS, the steering unit 10, the from wheel unit 12, and the rear wheel unit 14 can be suppressed from colliding with such an obstacle.

(Variants)

In the above embodiment, the right front wheel motor 232, the left front wheel motor 242, the right rear wheel motor, and the left rear wheel motor may be in-wheel motors (not shown) that are respectively incorporated in the right front wheel 192, the left front wheel 212, the right rear wheel 252, and the left rear wheel 272.

In the above embodiment, the steering motor 176, the right front wheel motor 232, the left front wheel motor 242, the right rear wheel motor, and the left rear wheel motor may be outer rotor brushless DC motors, may be brushed DC motors, may be AC motors, or may be other types of motors.

In the above embodiment, the handle unit 8 shown in FIG. 6 may include a cover member (not shown) covering the movable cam member 90, the fixed cam member 92, the coil spring 94, and a part of the handle shaft 84. In this case, the fixed member 82 may constitute a part of the cover member.

In the above embodiment the handle units 8, 108 shown in FIGS. 6 and 13 may each include another type of elastic member instead of the coil spring 94, 136. Further, the handle units 8, 108 may each include a damper (not shown) configured to apply a damping force on pivoting of the handle shaft 84, 126.

As above, in one or more embodiments, the cart 2 comprises: the carriage unit 4 (example of the carriage); the right front wheel 192, the left front wheel 212, the right rear wheel 252 and the left rear wheel 272, each of which is supported by the carriage unit 4 and touches the ground; and the suspension mechanism 11 configured to support right front wheel 192 and the left front wheel 212 as steering wheels. The suspension mechanism 11 includes: the steering shaft 168 configured to rotate with respect to the carriage unit 4; the steering plate 170 (example of the link member) fixed to the steering wheel 168; the right tie rod 172 and the left tie rod 174 (examples of the tie rod) each including one end rotatably attached to the steering plate 170; the right holding member 195 and the left holding member 215 (examples of the holding member) to which the other ends of the right tie rod 172 and the left tie rod 174 are rotatably attached, the right holding member 195 and the left holding member 215 being rotatably supported by the carriage unit 4 about the steering axis and rotatably holding the right front wheel 192 and the left front wheel 212 about the rotation axis; and the right buffer member 206 and the left buffer member 226 (examples of the buffer member) interposed between the right holding member 195 and the carriage unit 4, and between the left holding member 215 and the carriage unit 4. When the can 2 is viewed from behind, the lower space 290 is defined under the carriage unit 4. The lower space 290 extends upward from the ground GS, contains the midpoint CP1 of the straight line CL1 connecting the center of the right front wheel 192 and the center of the left front wheel 212, and contains the midpoint CP2 of the straight line CL2 connecting the center of the right rear wheel 252 and the center of the left rear wheel 272. The lower space 290 between the right front wheel 192 and the left front wheel 212 has the width CW1 of ⅓ or more of the distance W1 between the left side surface of the right front wheel 192 and the right side surface of the left front wheel 212. The lower space 290 between the right rear wheel 252 and the left rear wheel 272 has the width CW2 of ⅓ or more of the distance W2 between the left side surface of the right rear wheel 252 and the right side surface of the left rear wheel 272.

According to the above configuration, the lower space 290 that extends upward from the ground GS and has a sufficient dimension in each of the front-rear, left-right, and up-down directions is defined below the carriage unit 4. Due to this, even when an obstacle is on the ground GS on which the cart 2 travels, the suspension mechanism 11 can be suppressed from colliding with the obstacle.

In one or more embodiments, the other ends of the right tie rod 172 and the left tie rod 174 are rotatably attached to the right holding member 195 and the left holding member 215 above the rotation axis of the right front wheel 192 and the left front wheel 212.

According to the above configuration, the right tie rod 172 and the left tie rod 174 can be arranged at a higher position, and the rigid tie rod 172 and the left tie rod 174 can be suppressed from colliding with the obstacle on the ground GS.

In one or more embodiments, the suspension mechanism 11 further includes light lower arm 204 and the left lower arm 224 (examples of the first arm member) including one ends rotatably attached to the carriage unit 4 and the other ends rotatably attached to the right holding member 195 and the left holding member 215. One ends of the right buffer member 206 and the left buffer member 226 are rotatably attached to the carriage unit 4. The other ends of the right buffer member 206 and the left buffer member 226 are rotatably attached to the right lower arm 204 and the left lower arm 224.

According to the above configuration, angles of the right holding member 195 and the left holding member 215 with respect to the carriage unit 4 can be suppressed from changing even when the carriage unit 4 sinks with respect to the right front wheel 192 and the left front wheel 212, and ground-touching angles of the right front wheel 192 and the left front wheel 212 can be stabilized.

In one or more embodiments, the right holding member 195 and the left holding member 215 each include: the right kingpin 198 and the left kingpin 218 (examples of the kingpin) extending along the steering axis; and the right sleeve 200 and the left sleeve 220 (examples of the support member) rotatably supporting the right kingpin 198 and the left kingpin 218. The other ends of the right lower arm 204 and the left lower arm 224 are rotatably attached to the right sleeve 200 and the left sleeve 220.

According to the above configuration, since the steering axis can be located near the right front wheel 192 and the left front wheel 212, scrub radii of the right front wheel 192 and the left front wheel 212 can be reduced, and steering performance can be improved.

In one or more embodiments, in a state where no luggage is placed on the cart 2 and the cart 2 is stopped, the one ends of the right lower arm 204 and the left lower arm 224 are positioned higher titan the other ends of the right lower arm 204 and the left lower arm 224 by the first predetermined height H1. In the state where the cart 2 is in use and the maximum load allowed for the right buffer member 206 and the left buffer member 226 is applied to the right buffer member 206 and the left buffer member 226, the one ends of the right lower arm 204 and the left lower arm 224 are positioned lower than the other ends of the right lower arm 204 and the left lower arm 224 by the second predetermined height H2. The first predetermined height H1 is substantially equal to the second predetermined height 112.

The lengths of the right tie rod 172 and the left tie rod 174 projected to a plane parallel to the ground GS increase as the carriage unit 4 sink in with respect to the right front wheel 192 and the left front wheel 212, reach their maximum when the one ends and the other ends of the right lower arm 204 and the left lower arm 224 come to the same height, and thereafter decrease as the carriage unit 4 further sink in with respect to the fight front wheel 192 and the left front wheel 212. According to the above configuration, since the lengths of the right front wheel 192 and the left front wheel 212 projected to the plane parallel to the ground GS are substantially the same between the state in which the carriage unit 4 is not sinking and the state in which the carriage unit 4 has sunk to the maximum, the variation range of the lengths of the right tie rod 172 and the left tie rod 174 projected to the plane parallel to the ground GS can be reduced.

In one or more embodiments, when the suspension mechanism 11 is viewed from above, the right tie rod 172 and the left tie rod 174 and the right lower arm 204 and the left lower arm 224 intersect.

According to the above configuration, the right front wheel 192 and the left front wheel 212 can be steered at a greater steering angle as compared to the case in which the right tie rod 172 and the left tie rod 174 and the right lower arm 204 and the left lower arm 224 are not in such an intersecting relationship.

In one or more embodiments, the suspension mechanism 11 further includes the right upper arm 202 and the left upper arm 222 (examples of the second arm member) different from the right lower arm 204 and the left lower arm 224, and the right upper arm 202 and the left upper arm 222 include one ends rotatably attached to the carriage unit 4 and the other end rotatably attached to the right holding member 195 and the left holding member 215.

According to the above configuration, the angles of the right holding member 195 and the left holding member 215 with respect to the carriage unit 4 can further be suppressed from changing even when the carriage unit 4 sinks with respect to the right front wheel 192 and the left front wheel 212, and the ground-touching angles of the light front wheel 192 and the left front wheel 212 can further be stabilized.

In one or more embodiments, the other ends of the right buffer member 206 and the left buffer member 226 are rotatably attached to the side surfaces of the right lower arm 204 and the left lower arm 224.

According to the above configuration, the dimension of the suspension mechanism 11 in the up-down direction can be reduced, and the lower space 290 can be given a greater volume. Even when an obstacle is on the ground GS on which the cart 2 travels, the suspension mechanism 11 can be suppressed from colliding with such an obstacle.

In one or more embodiments, the cart 2 further comprises the steering handle 73, 113 to be gripped by the user.

According to the above configuration, the right front wheel 192 and the left front wheel 212 can be steered in response to the operation on the steering handle 7, 113 by the user.

In one or more embodiments, the cart 2 further comprises: the rotation angle sensor 88, 132 (examples of the input sensor) configured to detect an operation on the steering handle 73, 113 by the user; and the steering motor 176 configured to rotate the steering shaft 168 in response to the operation by the user detected by the rotation angle sensor 88, 132. The steering handle 73, 113 and the steering shaft 168 are mechanically separated.

According to the above configuration, since a mechanism for mechanically coupling the steering handle 73, 113 and the suspension mechanism 11 can be omitted, the structure of the cart 2 can be simplified.

In one or more embodiments, the cart 2 further comprises the right front wheel motor 232, the left front wheel motor 242, the right rear wheel motor, and the left rear wheel motor configured to rotate the right front wheel 192, the left front wheel 212, the right rear wheel 252, and the left rear wheel 272.

According to the above configuration, by actuating the right front wheel motor 232, the left front wheel motor 242, the right rear wheel motor, and the left rear wheel motor upon carrying luggage, workload for carrying the luggage can be reduced.

In one or more embodiments, the right front wheel motor 232, the left front wheel motor 242, the right rear wheel motor, and the left rear wheel motor are in-wheel motors.

According to the above configuration, the structure of the cart 2 can further be simplified as compared to the case in which motors other than the in-wheel motors are used as the right front wheel motor 232, the left front wheel motor 242, the right rear wheel motor, and the left rear wheel motor.

What is claimed is:

1. A cart comprising:
a carriage;
a right front wheel, a left front wheel, a right rear wheel and a left rear wheel, each of which is supported by the carriage and touches ground; and
a suspension mechanism configured to support at least one of the right front wheel, the left front wheel, the right rear wheel and the left rear wheel as a steering wheel,
wherein the suspension mechanism includes:
a steering shaft configured to rotate with respect to the carriage;
a link member fixed to the steering shaft;
a tie rod including one end rotatably attached to the link member;
a holding member to which the other end of the tie rod is rotatably attached, the holding member being rotatably supported by the carriage about a steering axis and rotatably holding the steering wheel about a rotation axis; and
a buffer member interposed between the holding member and the carriage,
when the cart is viewed from behind, a lower space is defined under the carriage,
the lower space extends upward from the ground,
the lower space contains a midpoint of a first line segment connecting a center of the right front wheel and a center of the left front wheel,
the lower space contains a midpoint of a second line segment connecting a center of the right rear wheel and a center of the left rear wheel,
the lower space between the right front wheel and the left front wheel has a width of ⅓ or more of a distance between a left side surface of the right front wheel and a right side surface of the left front wheel,
the lower space between the right rear wheel and the left rear wheel has a width of ⅓ or more of a distance between a left side surface of the right rear wheel and a right side surface of the left rear wheel,
the suspension mechanism further includes a first arm member including one end rotatably attached to the carriage and the other end rotatably attached to the holding member,
one end of the buffer member is rotatably attached to the carriage,
the other end of the buffer member is rotatably attached to the first arm member,
in a state where no luggage is placed on the cart and the cart is stopped, the one end of the first arm member is positioned higher than the other end of the first arm member by a first predetermined height,
in a state where the cart is in use and a maximum load allowed for the buffer member is applied to the buffer member, the one end of the first arm member is positioned lower than the other end of the first arm member by a second predetermined height, and
the first predetermined height is substantially equal to the second predetermined height.

2. The cart according to claim 1, wherein
the lower space further contains a line segment connecting the midpoint of the first line segment and the midpoint of the second line segment.

3. The cart according to claim 1, wherein the other end of the tie rod is rotatably attached to the holding member above the rotation axis of the steering wheel.

4. The cart according to claim 1, wherein the holding member includes:
a kingpin extending along the steering axis; and
a support member rotatably supporting the kingpin, and
the other end of the first arm member is rotatably attached to the support member.

5. The cart according to claim 1, wherein, when the suspension mechanism is viewed from above, the tie rod and the first arm member intersect.

6. The cart according to claim 1, wherein the suspension mechanism further includes a second arm member different from the first arm member, and
the second arm member includes one end rotatably attached to the carriage and the other end rotatably attached to the holding member.

7. The cart according to claim 1, wherein the other end of the buffer member is rotatably attached to a side surface of the first arm member.

8. The cart according to claim 1, further comprising a steering handle to be gripped by a user.

9. The cart according to claim 8, further comprising:
an input sensor configured to detect an operation on the steering handle by the user; and
a steering motor configured to rotate the steering shaft in response to the operation by the user detected by the input sensor, wherein
the steering handle and the steering shaft are mechanically separated.

10. The cart according to claim 1, further comprising at least one wheel motor configured to rotate at least one of the right front wheel, the left front wheel, the right rear wheel and the left rear wheel as at least one driving wheel, and
the at least one wheel motor is corresponding to the at least one driving wheel, respectively.

11. The cart according to claim 10, wherein the at least one wheel motor is an in-wheel motor.

12. A cart comprising:
a carriage;
a right front wheel, a left front wheel, a right rear wheel and a left rear wheel, each of which is supported by the carriage and touches ground; and
a suspension mechanism configured to support at least one of the right front wheel, the left front wheel, the right rear wheel and the left rear wheel as a steering wheel,
wherein the suspension mechanism includes:
a steering shaft configured to rotate with respect to the carriage;
a link member fixed to the steering shaft;
a tie rod including one end rotatably attached to the link member;
a holding member to which the other end of the tie rod is rotatably attached, the holding member being rotatably supported by the carriage about a steering axis and rotatably holding the steering wheel about a rotation axis; and
a buffer member interposed between the holding member and the carriage,
when the cart is viewed from behind, a lower space is defined under the carriage,
the lower space extends upward from the ground,
the lower space contains a midpoint of a first line segment connecting a center of the right front wheel and a center of the left front wheel,
the lower space contains a midpoint of a second line segment connecting a center of the right rear wheel and a center of the left rear wheel,
the lower space between the right front wheel and the left front wheel has a width of ⅓ or more of a distance between a left side surface of the right front wheel and a right side surface of the left front wheel,
the lower space between the right rear wheel and the left rear wheel has a width of ⅓ or more of a distance between a left side surface of the right rear wheel and a right side surface of the left rear wheel,
wherein the other end of the tie rod is rotatably attached to the holding member above the rotation axis of the steering wheel,
wherein the suspension mechanism further includes a first arm member including one end rotatably attached to the carriage and the other end rotatably attached to the holding member,
one end of the buffer member is rotatably attached to the carriage,
the other end of the buffer member is rotatably attached to the first arm member,
the holding member includes:
a kingpin extending along the steering axis; and
a support member rotatably supporting the kingpin,
the other end of the first arm member is rotatably attached to the support member,
in a state where no luggage is placed on the cart and the cart is stopped, the one end of the first arm member is positioned higher than the other end of the first arm member by a first predetermined height,
in a state where the cart is in use and a maximum load allowed for the buffer member is applied to the buffer member, the one end of the first arm member is positioned lower than the other end of the first arm member by a second predetermined height,
the first predetermined height is substantially equal to the second predetermined height,
when the suspension mechanism is viewed from above, the tie rod and the first arm member intersect,
the suspension mechanism further includes a second arm member different from the first arm member,
the second arm member includes one end rotatably attached to the carriage and the other end rotatably attached to the holding member,
the other end of the buffer member is rotatably attached to a side surface of the first arm member,
the cart further comprises:
a steering handle to be gripped by a user,
an input sensor configured to detect an operation on the steering handle by the user; and
a steering motor configured to rotate the steering shaft in response to the operation by the user detected by the input sensor,
the steering handle and the steering shaft are mechanically separated,
the cart further comprises at least one wheel motor configured to rotate at least one of the right front wheel, the left front wheel, the right rear wheel and the left rear wheel as at least one driving wheel,
the at least one wheel motor is corresponding to the at least one driving wheel, respectively, and
the at least one wheel motor is an in-wheel motor.

* * * * *